United States Patent [19]

Eickmann

[11] Patent Number: 4,745,846
[45] Date of Patent: May 24, 1988

[54] DEVICES WHICH TAKE IN AND EXPEL FLUID BY A CHAMBER WHICH MAY BORDER A CONED RING

[76] Inventor: Karl Eickmann, 2420 Isshiki, Hayama-machi, Kanagawa-ken, Japan

[21] Appl. No.: 809,105

[22] Filed: Dec. 16, 1985

Related U.S. Application Data

[60] Continuation-in-part of Ser. No. 806,574, Dec. 9, 1985, Pat. No. 4,690,623, which is a division of Ser. No. 282,990, Jul. 14, 1981, Pat. No. 4,557,347, which is a continuation-in-part of Ser. No. 910,809, May 30, 1978, abandoned, and a continuation-in-part of Ser. No. 911,246, May 31, 1978, abandoned, and a continuation-in-part of Ser. No. 224,769, Jan. 31, 1981, abandoned.

[51] Int. Cl.⁴ .................. F01B 1/00; F01B 3/00; F01B 13/04
[52] U.S. Cl. ............................ 91/488; 91/498; 92/45; 92/58; 92/110; 92/148; 417/473
[58] Field of Search .................... 417/472, 473; 92/42, 92/45, 46, 47, 110, 181 P, 58, 130 B, 148; 91/488, 491, 498

[56] References Cited

U.S. PATENT DOCUMENTS

| | | | |
|---|---|---|---|
| 82,276 | 9/1868 | Belleville | 92/46 X |
| 1,231,302 | 6/1917 | Scott | 92/45 X |
| 1,341,669 | 6/1920 | Porter | 92/45 X |
| 2,289,639 | 7/1942 | Fausek et al. | 92/48 X |
| 2,506,725 | 5/1950 | Magrum | 92/46 |
| 2,534,123 | 12/1950 | Hasselhorn | 92/45 X |
| 2,889,781 | 6/1959 | Thompson | 417/273 X |
| 3,195,808 | 7/1965 | Holt | 417/273 X |
| 3,255,706 | 6/1966 | Eickmann | 92/58 |

FOREIGN PATENT DOCUMENTS

| | | | |
|---|---|---|---|
| 43525 | 3/1908 | Switzerland | 417/472 |
| 438404 | 11/1935 | United Kingdom | 417/472 |

Primary Examiner—Robert E. Garrett
Assistant Examiner—Mark A. Williamson

[57] ABSTRACT

In a fluid pump or motor improvements are provided to the piston shoes therein to permit a higher pressure in the respective device. Other improvements are done to the hydrostatic bearings in radial piston or radial chamber type fluid motors and pumps. A further arrangement is, that plural pistons are applied to permit the use of two different fluids in the respective device. This leads also to the application of disc springs and their modification in a pump or motor to make the pumping of non-viscous fluids like water possible at very high pressure. Motors are provided with arrangements to permit them to drive and to carry simultaneously or to have hollow shafts, whereby improved and novel machines and vehicles are obtained.

9 Claims, 14 Drawing Sheets

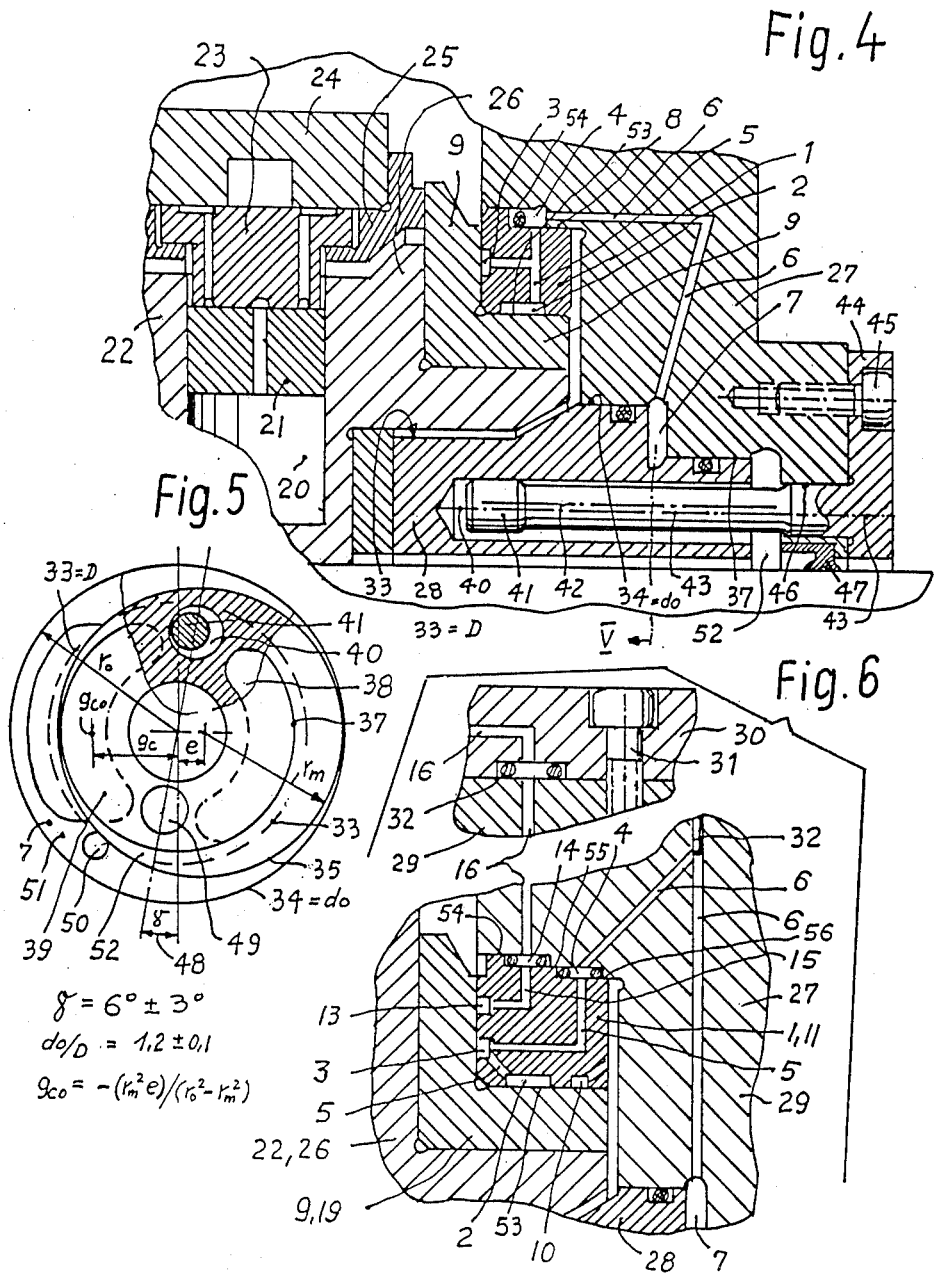

$$d_{TH} = \sqrt{(\tfrac{\pi}{4})(R_o^2-R_i^2)\pi G f_b/(z/2)}$$
$$r_{gc} = (2/3)(R_o^3-R_i^3)/(R_o^2-R_i^2)$$

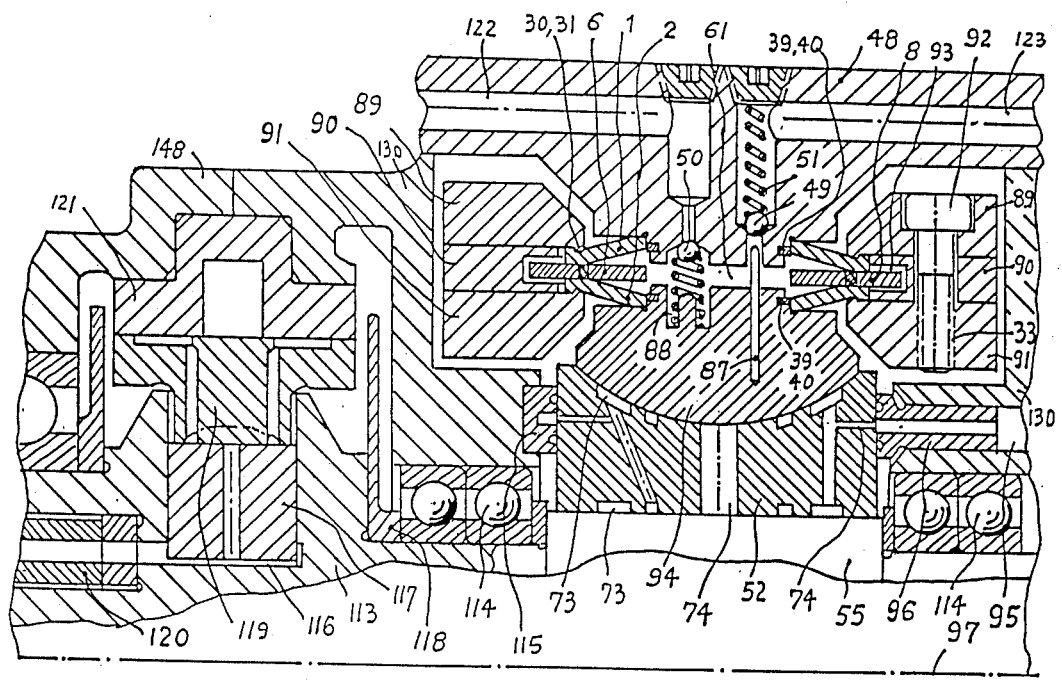
Fig. 14
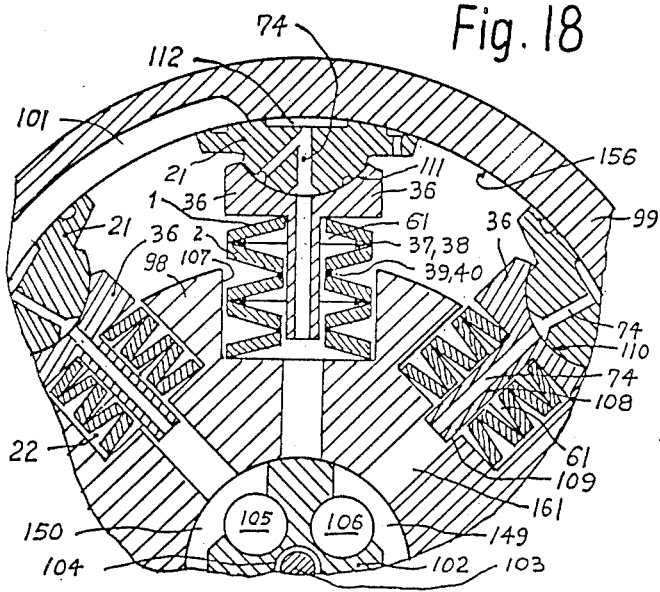
Fig. 18
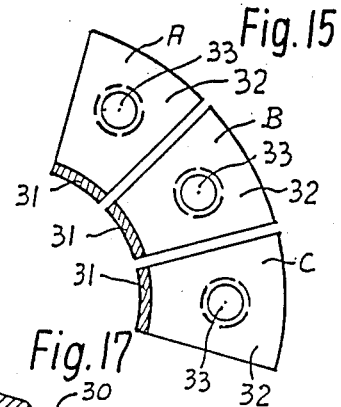
Fig. 15
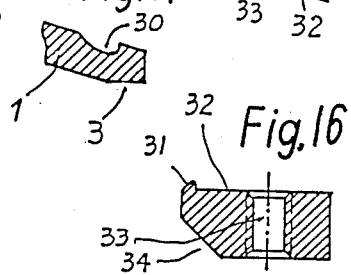
Fig. 17
Fig. 16

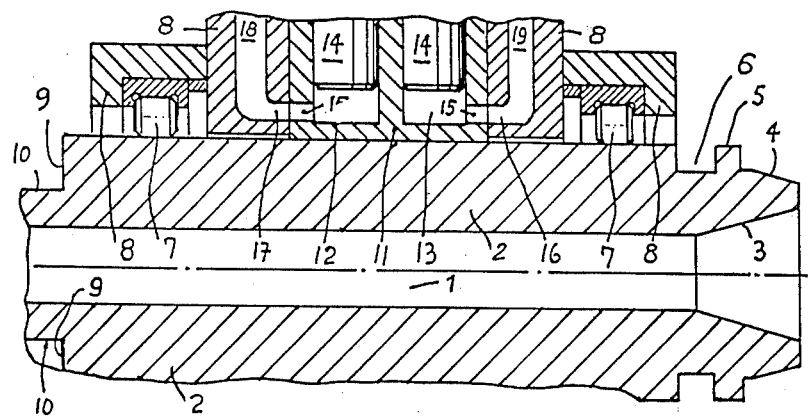
Fig. 24
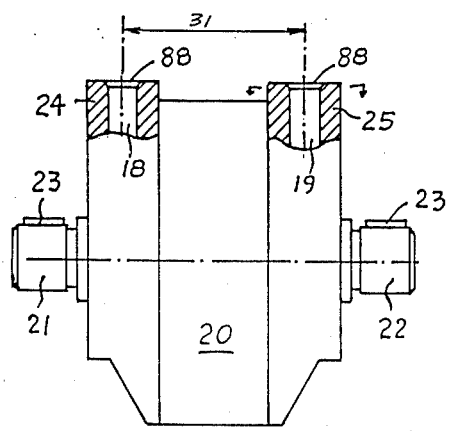
Fig. 25
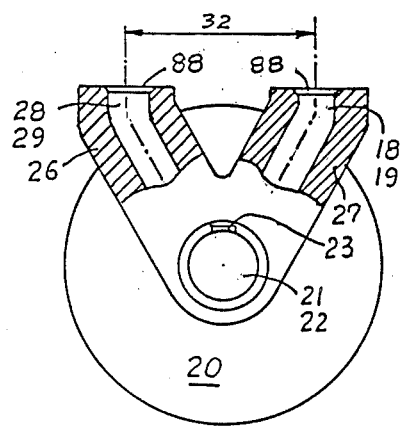
Fig. 26
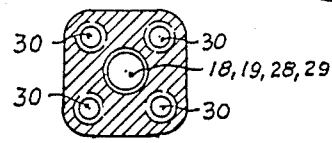

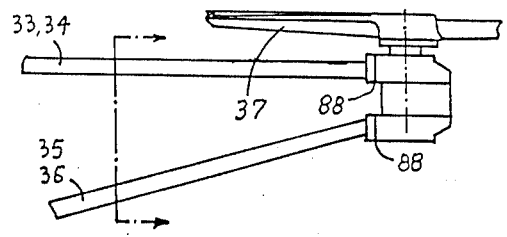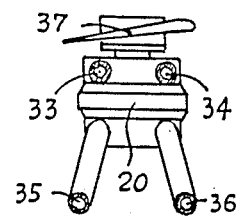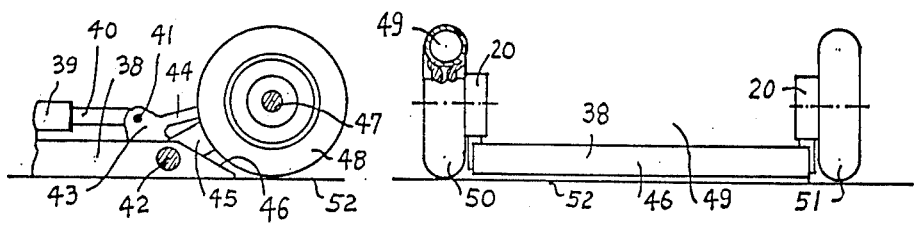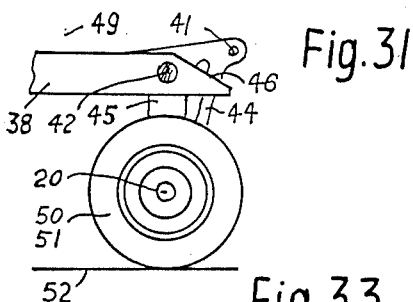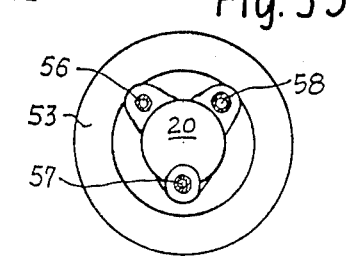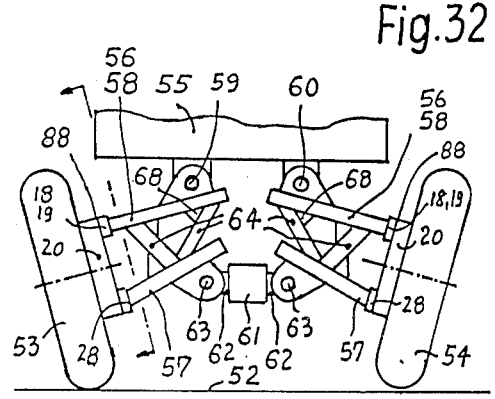

$tg.x = \Delta Y/\Delta R$
$\Delta Y = \Delta R \cdot tg.x$
$dY = tg x \, dR$
$f = tg.x_f(R_o - r_i)$
$dA = (1/2) dR \, dY$
$\quad = 0.5 dR \times tg x \, dR$
$\quad = 0.5 tg x \, dR \, dR$
$dV = dA \phi \pi = dA \, 2RT$
$\quad = 2R \pi \, dA$
$\quad = 2RT \, 0.5 \, tg x \, dR \, dR$
$V = \int \pi tg.x \, R \, dR \, dR = \pi tg x \int R \, dR \, dR = \pi tg x \int (1/2) R^2 dR = \pi tg x (1/2)(1/3) R^3$
$\quad = \pi tg x (1/6) R^3$ in bondaries $|_{r_i}^{R_o}$ ∗ $V = (\pi/6) \, tangent \, x \, [R_o^3 - r_i^3]$ $V_{ELEMENT} = (\pi/6) \, tang \, x \, (R_o^3 - r_i^3)$
$V_{TOTAL} = (\pi/6) \, tang \, x \, (R_o^3 - r_i^3) + r_i^2 \pi h$
$V_F = (\pi/6) \, tang \, x_f \, (R_o^3 - r_i^3) + r_i^2 \pi \, tang \, x_f (R_o - r_i)$ WITH  V = DELIVERY VOLUME; ta. tang = tangent

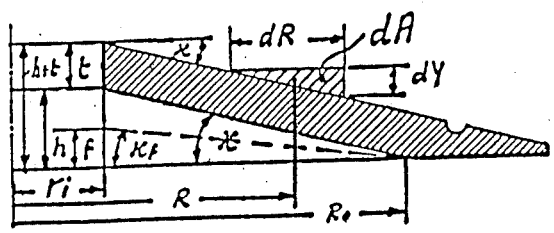

Fig. 39

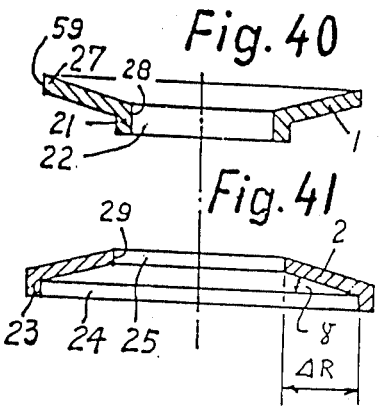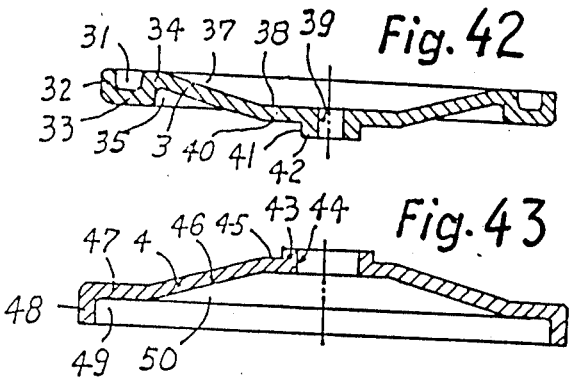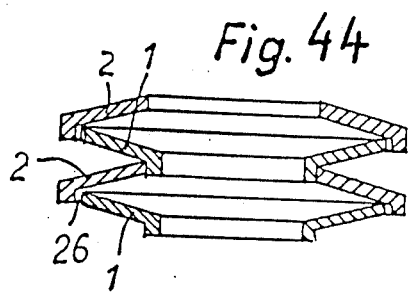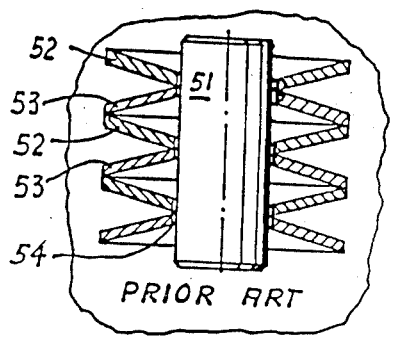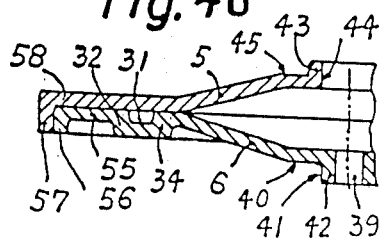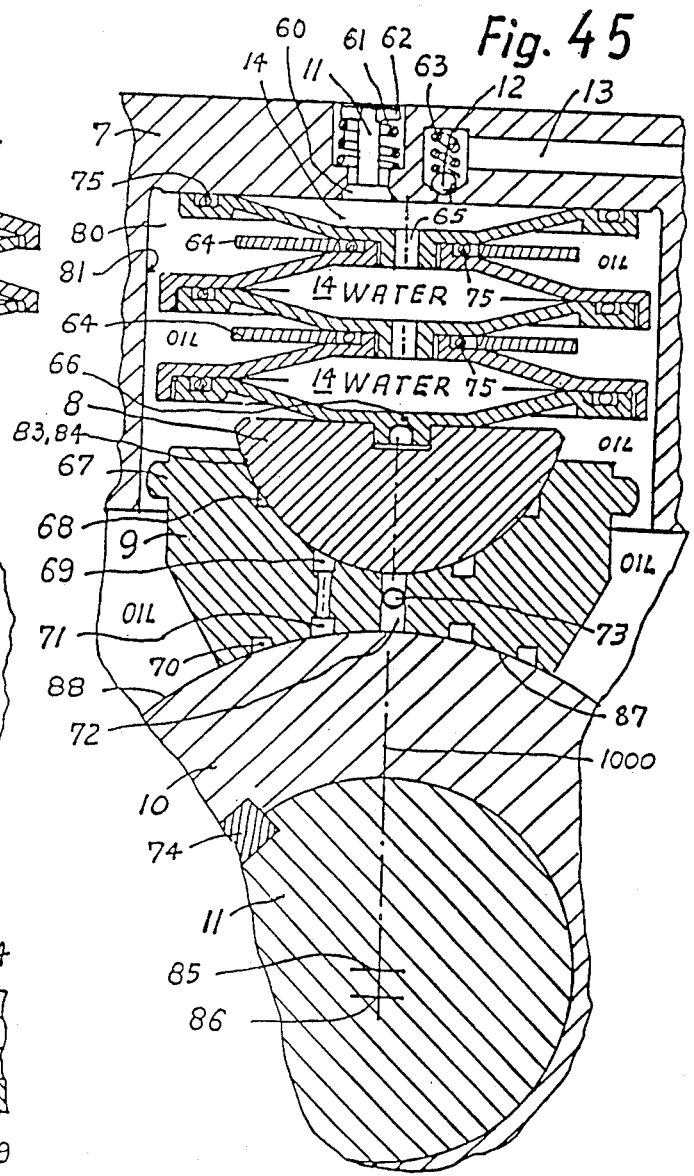

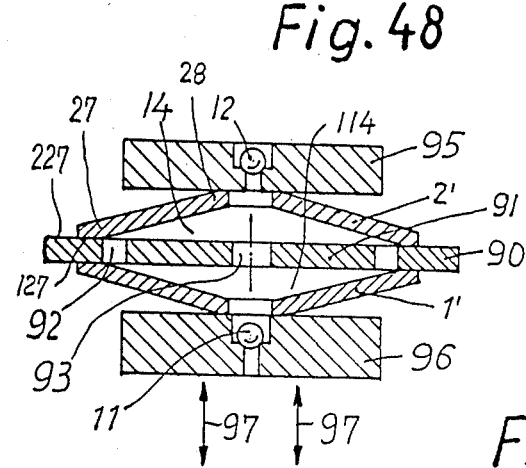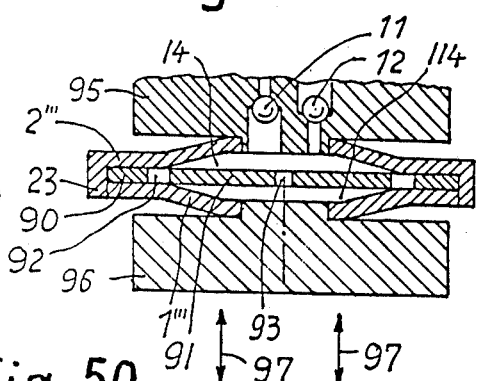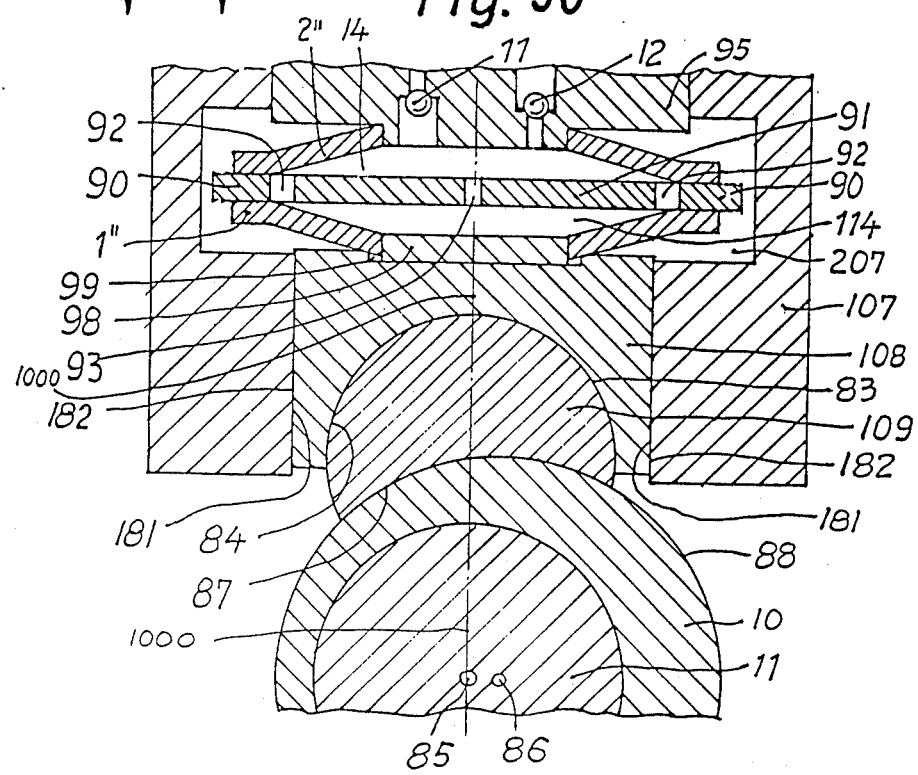

DEVICES WHICH TAKE IN AND EXPEL FLUID BY A CHAMBER WHICH MAY BORDER A CONED RING

REFERENCE TO RELATED APPLICATIONS

This is a continuation-in-part of Ser. No. 806,574, Dec. 9, 1985, now U.S. Pat. No. 4,690,623, which is a division of Ser. No. 282,990, July 14, 1981, now U.S. Pat. No. 4,557,347, which is a continuation-in-part of Ser. No. 910,809, May 30, 1978, abandoned, and a continuation-in-part of Ser. No. 911,246, May 31, 1978, abandoned, and a continuation-in-part of Ser. No. 224,769, Jan. 13, 1981, abandoned.

BACKGROUND OF THE INVENTION

(a) FIELD OF THE INVENTION

This invention relates to hydrostatic or pneumatic fluid pumps or motors and to devices, like machines and vehicles, wherein the respective pumps or motors are applied. Improvements are made to a piston and piston-shoe assembly to improve the range of pressure in the device economically. Other improvements are made to hydrostatic bearing applications and their communications to spaces under pressure. This is done for hydrostatic bearings on the ends of the rotor(s) as well as to a hydrostatic bearing in the middle between two respective rotors. Consideration is also given to the problem, that some fluids do not have good lubrication properties, like for example, water. Therefore disc-spring modifications have been applied in order to make a pump or motor possible without a closely fitted piston which might weld in a cylinder when operating non-lubricating fluid. Finally improvements have been made in the directions and configurations of the ports as well as in the bearings of fluid motors to permit a radial-chamber fluid motor to drive a rotary movement and at the same time to carry a load, whereby several new and useful machines and vehicles are possible by the application of the hollow shaft motor or of the drive and carry motor of the invention.

(b) DESCRIPTION OF THE PRIOR ART

The prior art which is partially related to this present patent application is shown for example in my U.S. Pat. Nos. 3,850,201; 3,951,044; 3,874,271; 3,223,046; 4,265,497 or others and also in my elder applications Ser. Nos. 910,809; 911,246 and 224,769. The content of applications Ser. Nos. 910,809 and 911,246 was published in the West German DOS No. 2,921,765 on Feb. 2, 1980.

The former art shows piston shoes, which are entering, diving, deep diving piston shoes to obtain long piston strokes or the piston shoes of the former art are outer piston shoes which are assumed to carry a high radial load to permit high pressures in the devices.

The former art also does attempt to provide hydrostatic bearings or support bearings on the rotors of the pump or motors.

The former art also shows control bodies which are responsive to partially eccentric thrust chambers.

While the devices of the described former art act generally satisfactory at certain pressures and rotary revolutions, there are appearing presently limitations, when the devices of the former art are tested in conditions with still higher pressures or revolutions. Problems are also arising, when not very lubricatious fluids are used in the pumps and motors. For example, when water is used instead of oil, the pistons in the respective cylinders are tending to wear and stick. The same applies to piston shoes of the former art, when they are applied in water pumps or water operated motors.

The hydrostatic bearings of the former art are heretofore applied to act for certain purposed. In present more general applications however, it appears, that the failure to employ all and the right fluid pressure pockets and communications are limiting their use.

And the fluid motors of the former art are commonly unable to permit a hollow shaft with a large enough a diameter to permit the setting of strong machine tool spindles into the respective rotor. The motors of the former art are also failing to permit at the same time the operation of multi-functions, like for example, to drive the rotary movement of an element and to carry the element or a load thereon. They are also failing to be carried by such element and then carry a load themselves.

SUMMARY OF THE INVENTION

The aim of the invention is, to overcome at least partially the limitations of the former art and thereby to improve the devices of the former art as well as to provide novel and useful pumps, motors, machine tools, devices or vehicles, which apply such novel pumps or motors.

It is therefore an object of the invention to provide a piston-piston shoe assembly in a radial piston device, which is able to carry a high radial load and thereby to operate the device with high pressure, while at the same time a portion of the assembly is capable of temporarily entering into the cylinder of the device in order to obtain a relatively long piston stroke.

Another object of the invention is, to prevent the pivoting and sticking of a control body.

A further object of the invention is, to apply a hydrostatic bearing to a housing and a rotor of the device, whereby the bearing builds axially short and carries either a radial load or a radial and an axial load, while it is communicated to a respective space with fluid under pressure.

In a still further object of the invention, the bearing is communicated to a thrust chamber between two seats of a thrust- and control-body.

Still another object of the invention is, to provide to a medial rotor bearing the respective suitable communications, to place the thrust chambers and pistons thereof onto a correct radius "rgc"; to provide correct diameters to the thrust chambers and pistons therein, and also to provide a second axial bearing and communications to a rotor on the other end of the device in order to permit two different pressures in a device with a medial rotor bearing between two rotors and axial thrust provisions in the inner portion of the medial rotor bearing.

A still other object of the invention is, to depart the axis of a stroke guide actuator in two different dimensions away from the axes of the rotor and of the control body to increase the smoothness of operation of a pump or motor.

An important object of the invention is also, to provide a pump or motor without pistons which fit closely in cylinders, wherein they are reciprocating, in order to make it possible to use a fluid with little or no capability to lubricate the fitting and moving surfaces, like for examples, water.

An object in this connection is also, to use disc-springs to form a pumping or motoring chamber and to compress the chamber by a respective thrust piston.

A still further object of the invention is, to modify the common disc to be able to fulfill the object of using it in or on or to form a pumping or motoring fluid handling chamber.

Still another object of the invention is, to provide dead space fillers or dead space preventers to disc-spring pumping or motoring chambers.

A further object of the invention is, to provide centering portions or centering bodies to a disc spring assembly.

Another object of the invention is, to provide a simple pump or motor with no fitting pistons or cylinders and to operate the device exclusively by a disc-spring assembly with a piston shoe and a guide face for the piston shoes, whereby the pump becomes very inexpensive and so the motor.

A further object of the invention is, to provide seal means onto a respective tapered disc spring to make a simple application as pumping or motoring chamber possible.

A still other important object of the invention is, to provide a super-critical pressure stage in a pump or motor, wherein the pumping or motor chambers are built by at least one disc spring and the super-critical range permits extremely high pressures by clamping the radial outer end of the respective disc-spring to prevent an opening of a disc-spring pumping or motoring chamber under high fluid pressure in the respective chamber.

Due to an object of the invention, related to the last object herebefore is, to divide the clamping ring assembly into sections and to provide grooves and into the grooves entering portions on the sections or disc springs in order to prevent escape of the clamping sections from the outer ends of the respective disc spring.

A still other object of the invention is, to provide a tapered disc spring of strong, but glueable material, as for example, carbon fibre and to glue a plurality of disc springs of this type together by respective adhesive material as for example epoxy resin.

According to a further object of the invention, the water pump of disc spring pumping chambers is driven by a hydrostatic motor with a speed range of rotary velocity, suitable to permit a long life of the disc spring pumping or motoring chamber.

In another object of the invention, suitable means are provided to drive the disc-spring compression by a respective piston and piston shoe, whereby the faces between the piston and shoe are lubricated by a suitable fluid, for example, by oil, and wherein suitable fluid supply means and communications are provided.

A still further object of the invention deals with arrangements to operate two different fluids.

Therein two different pistons may become connected by suitable arrangement in accordance with a respective object of the invention, to move both pistons in unison.

An object of the invention provides a thrust chamber around the respective ends of the two pistons and different diameters to the pistons, whereby the pressure in fluid in the thrust chamber drives the pistons in a respective outward stroke.

While in a still further object of the invention, a dirty-fluid collection chamber and dirty-fluid exit passage is provided to prevent a mixing and dirtying of two separated and different fluids in the respective pump or motor.

Another object of the invention is, to set radially distanced from the wall of the cylinder wherein a first piston operates, a ring-groove with a spring therein and to provide a spring bearing and a spring seat on one end of the respective piston to move the respective piston by the expansion force of the spring in an outward stroke.

A further object of the invention is, to provide a housing and strong bearings therein together with a fluid motor of a radial chamber type in order to apply a spindle onto the rotor, whereby the spindle is capable of machine tool or respective work, when it is revolved by the mentioned fluid motor.

In a further object of the invention, related thereto, the spindle or shaft is axially moveable in the bearings and in the rotor of the motor and provided with respective seats or holding portions in order to make the application of an axial drive arrangement or thrust and retraction arrangement possible on said shaft to operate the shaft or spindle automatically for rotary movement at work and at the same time to adjust or automatically adjust and stop the axial penetration of the respective spindle.

An other object of the invention provides a hollow shaft motor in order that a shaft or spindle might be inserted into the hollow portion of the motor or in order that the motor may be mounted respectively over a respective shaft or spindle of a device, machine or vehicle.

Still an other object of the invention is, to provide a "drive-and carry-motor" which has strong bearings in order to be able to carry a load in addition to the load in the rotor of the motor and which has ports which are directed in a single dimension with end faces perpendicular to the ports, whereby the motor obtains mounting plane faces whereinto the entrance and/or exit ports are porting in order to obtain an easy assembly of the motor onto a respective load, element, device, machine or vehicle at small space and weight, as well as cost.

Due to a further object of the invention, the drive and carry motor is applied in a truck or car and provided with a pivot arrangement to drive the wheels of the vehicle and to lower and lift the wheels or the body of the vehicle for easy loading of the vehicle and for smooth travel of the vehicle alternatively.

And, a still other object of the invention is, to provide a swing axis assembly with a structure and fluid motors to drive the wheels of the vehicle, wherein the device drives the wheels and at the same time acts as a shock-reducer;

While other objects of the invention are, to apply the drive and carry motor onto respective devices, machines or vehicles.

BRIEF DESCRIPTION OF THE DRAWINGS

FIG. 4 is a longtitudinal sectional view through a portion of a device of another embodiment of the invention and shows portions of a pump or motor, wherein a hydrostatic radial bearing is provided between the housing and the rotor, a novel communication is provided and the bearing may also act as a thrust bearing.

FIG. 5 shows a crossectional view and partially a view from the rear end onto and of a control body arrangement of the invention whereby the control body is partially visible also in the embodiment of FIG. 4.

FIG. 6 is a longitudinal sectional view through another embodiment of the invention of a double acting radial and/or axial bearing.

FIG. 14 is a longitudinal sectional view through a portion of a device, which illustrates another embodiment of the invention.

FIG. 15 is a cross-sectional view through a further embodiment of the invention.

FIG. 16 is a longitudinal sectional view through a disc spring portion of a further embodiment of the invention.

FIG. 17 is a related sectional view longitudinally taken through another embodiment of a disc spring portion of the invention.

FIG. 18 is a cross-sectional view through a simple pump or motor of a still further embodiment of the invention.

FIG. 24 is a longitudinal sectional view through an embodiment of the invention.

FIG. 25 is a view onto and in part a sectional view through an embodiment.

FIG. 26 is a view onto and in part a sectional view through an other embodiment of the invention, with a cross-sectional view therebelow.

FIG. 27 is a view onto an embodiment of the invention from the side thereof.

FIG. 28 is a cross sectional view through FIG. 27 along the arrows therein.

FIG. 29 is a view onto a portion of an arrangement of the invention.

FIG. 30 is a view onto the vehicle of FIG. 29 from the rear.

FIG. 31 is a view onto the portion of FIG. 29 in a modified situation.

FIG. 32 is a view from the rear onto an arrangement of the invention.

FIG. 33 is a cross-sectional view through FIG. 32 along the arrowed line therein;

FIG. 39 is a mathematical explanation.

FIG. 40 is a longitudinal sectional view through a disc spring set; and

FIG. 41 is a similar view through a disc spring set of the invention.

FIG. 42 is a longitudinal sectional view through another embodiment of an innerbend spring of the invention.

FIG. 43 is a longitudinal sectional view through another embodiment of an outerbend spring of the invention.

FIG. 44 is a longitudinal sectional view through a spring pair set of a plurality of spring pairs of FIGS. 40 and 41.

FIG. 45 is a longitudinal sectional view through a portion of a pumping arrangement, which can also be a radial sectional view, wherein the springs of FIGS. 42 and 43 are assembled.

FIG. 46 demonstrates a portion of a pair of springs of FIGS. 42 and 43 wherein radial extensions are provided to make these springs capable of especially great thrusts and strengthes.

FIG. 47 is a longitudinal sectional view through a set of disc springs of the former art and consequentely labeld as "prior art".

FIG. 48 is a longitudinal sectional view through another embodiment of an arrangement of the invention.

FIG. 49 is still another longitudinal sectional view through still a further embodiment of an arrangement of the invention, and, FIG. 50 is a longitudinal sectional view through a final and preferred arrangement of the invention.

DESCRIPTION OF THE PREFERRED EMBODIMENTS

Figure 1:
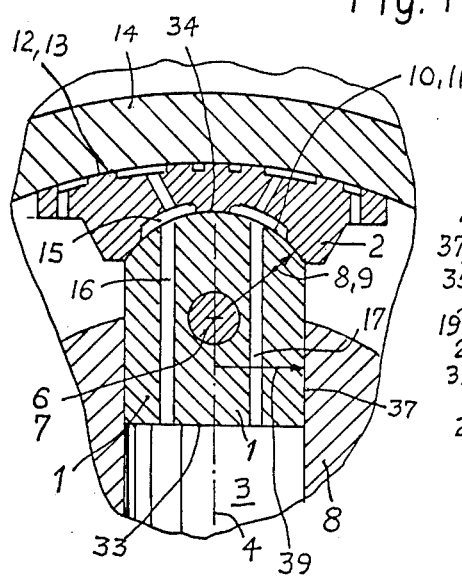
FIG. 1 is a longitudinal sectional view through an embodiment of a piston and piston shoe assembly of the invention.
Figure 2:
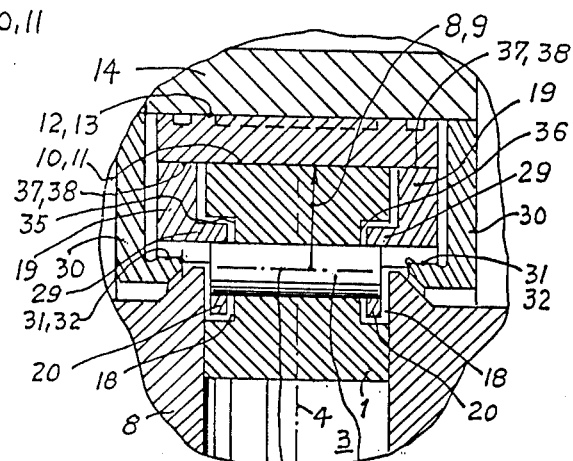
FIG. 2 is a cross-sectional view through FIG. 1 along the medial face and axis 4 of FIG. 1.
Figure 3:
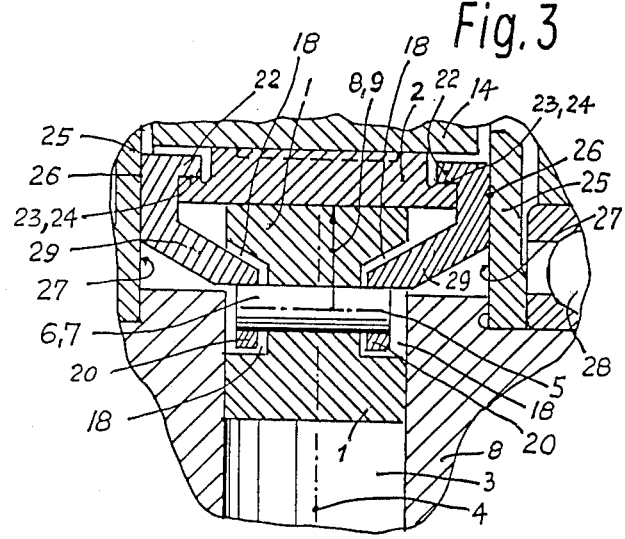
FIG. 3 is a longitudinal sectional view and at same time a radial and axial view through an other embodiment of a piston and piston shoe assembly of the invention.

FIGS. 1 to 3 demonstrate two embodiments of high-pressure piston-piston shoe assemblies of the invention. Piston and shoe assemblies are known in great number from my elder patents and from other patents. However, either they were of limited capability to carry high radial load under high pressures or they had only a limited length of piston stroke per given diameter of the device. That limited either the pressure of the device or the flow through quantity per revolution of the rotor of the device. The embodiments of these FIGS. 1 to 3 now are combining a relatively long piston stroke with the very high pressure capability of the piston and shoe.

For this purpose the embodiments of FIGS. 1 to 3 are providing the piston head with a bearing face 10 of a radius 8 around the second axis 5 which is normal to the first axis 4 of piston 1. The radius 8 is longer than the radius 39 of the outer diameter 37 of piston 1. Thereby the large capacity to carry a high radial load is obtained.

The bearing face 10 extends over the entire cross-sectional area of the piston which gives the large dimension of the bearing face 10. The bearing face 10 is formed with radius 8 around at least a portion of the first and second axes 4 and 5. When the bearing face 10 is spherical it is formed with radius 8 around the meeting point of the first and second axes 4 and 5. When the bearing face 10 is of part-cylindrical configuration, the radius or first radius 8 is formed around the second axis 5. The piston shoe slides with outer face 12 along the inner face 13 of the piston stroke actuator 14 as usual in my devices. The piston shoe 2 gets a swing face 11 of a second radius substantially equal to the mentioned first radius 8, to permit the smooth sliding of face 11 along face 10 during the swing or pivotion of the shoe 2 on piston 1.

Common to FIGS. 1 to 3 is a bore 6 along the normal second axis 5 and the setting of a pin 7 into it. Pin 7 extends on both ends out of the bore into a reception spaces 18 on both ends of the bore 6. The reception spaces 18 are cut into the piston 1 and form therein flattened portions 35 and 36.

The embodiment of FIGS. 1 and 2 differes from the embodiment of FIG. 3 slightly by the keeping arrangement, which keeps the piston 1 and shoe together to prevent escape of the swing face from the bearing face. The keeping arrangement includes at least a keeping element 19,29 and an entering part 20, which enters space 18 to embrace the ends of pin 7. More details of the assembly of FIGS. 1 to 3 are defined by the following detailed description and definitions 3 to 9:

3. The device of FIGS. 1 to 3,
wherein the piston 1 has a bottom end 33, a top end 34, a longitudinal first axis 4, a second axis 5 normal to said first axis 4 and located between said ends 33, 34
wherein one of said ends forms a bearing face 10 of a configuration of a constant first radius 8 around at least a portion of said axes 4, 5;
wherein a bore 6 is provided through said piston 1 along said second axis 5, while said second axis coincides with the respective axis of said bore 6;
wherein a pin 7 is inserted into said bore 6 to fit in said bore 6 and extend out of said bore on both ends thereof;
wherein said piston has a pair of flattened portions 35, 36 on the ends of said bore 6 to form reception spaces 18;
wherein said pins are of a length which is shorter than the diameter 37 of said piston 1 around said first axis 4;
wherein a piston shoe 2 is swingably connected to said piston 1;
wherein said piston shoe 2 has a slide face 12 and a swing face 11 for sliding with said slide face 12 along a respective guide face 13 of a piston stroke actuator guide 14 and for sliding with said swing face 11 along said bearing face 10 of said piston 1 while said swing face 11 is of a configuration complementary to the configuration of said bearing face 10 of a constant second radius 9 which is substantially equal to said first radius 8 with said swing face 11 extending with said second radius 9 around said at least one portion of said axes 4, 5;
wherein a pair of keeping elements 19 is provided to said piston 1 and shoe 2, while each of the elements of said pair of elements 19 is provided with an entering part 20 which has a bore fitting around the respective end of said pin 7 and being at least partially received within the respective space 18 of said reception spaces; and;
wherein a seat face 37, 23 is provided with said device, while said elements have seat walls 38, 24 to be guided by said seat faces.

4. The device of FIG. 3,
wherein said seat faces 23 are provided on said piston shoe 2 and said seat walls 24 of said elements 19 extend from medial portions 29 of said elements 19 towards the neighboring portions of said piston shoe embrace said seat faces 23, while said medial portions 29, 22 end in said entering parts 20, said medial portions are extending endwards of a portion of said piston shoe 2 along said piston shoe and said entering parts 20 of said elements are remaining at least partially within said spaces 18 and thereby within the outer diameter defines 37 of said piston 1,
whereby said keeping elements 19, 29 keep said piston 1 and said shoe 2 connected together and form a close fit of said bearing face 10 and of said swing face 11 during operation of said piston and shoe including during the swing of said shoe 2 relatively to said piston.

5. The device of FIG. 3,
wherein a rotor 8 is provided within said device and contains a cylinder 3 to facilitate a reciprotating movement of said piston 1 in said cylinder 3, end members 25 are provided on portions of said rotor 8 and endwards of said piston shoe 2 to form innermost radial plane faces 27 while said medial portions 29 of said elements 22 form outermost radial plane faces 26 to slide along said innermost plane faces 27 when said piston 1 reciprocates in said cylinder 3,
whereby said keeping elements 29 and said piston shoe 2 are retained between said innermost faces 27 to prevent an axial escape of said seat walls 22, 24 of said elements from said seat faces 22 of said piston shoe 2.

6. The device of FIGS. 1 and 2,
wherein said keeping element 19 forms a medial portion 29 which extends axially from a portion of said entering part 20 of said element to form an inner face 31,
while a pair of traction rings 30 is provided endwards of the axial ends of said piston shoe 2 to form outer seats 37 to be kept on a respective portion 38 of said actuator guide 14 of said device and to form outer faces 32, which extend toward a portion of said piston shoe to embrace and guide said inner faces 31 of said keeping elements 19, 29.

7. The device of FIGS. 1 and 2,
wherein said entering part 20 of said keeping element 19 is at least partially of an outer configuration and size to remain within the respective reception space 18 of said piston 1 and thereby within the confines of the outer diameter 37 of said piston to be capable of at least partially entering into the cylinder 3 when said piston 1 reciprocates in a cylinder 3 of the rotor 8 of said device.

8. The device of FIGS. 1 to 3,
wherein said first and second radii 8, 9 of said faces 10, 11 are longer than the radius 39 of the outer diameter 37 of the piston 1 around said longitudinal and first axis 4 of said piston 1.

9. The device of FIGS. 1 to 3, wherein said piston 1 is provided with a plurality of longitudinally from said bottom end 33 to said top end 34 of said piston 1 through said piston 1 extending passages 16, 17 to communicate a space 3 in a rotor 8 of said device with at least one fluid pressure packet 15 between said piston 1 and shoe 2 and, wherein said passages 16, 17 extend laterally of and distanced from said bore 6 to prevent communication between said bore 6 and said passages 16, 17.

In FIGS. 4 and 6 a solution for bearing a rotor in a housing is demonstrated. Rotor 26 is revolvably borne in housing 27. The Figures are longitudinal sectional views through respective portions of respective devices. Rotor 22 is subjected to a radial load for example out of chamber 20. It may also be subjected to an axial load in the direction to the right in the Figures. When the device is a radial piston machine of one or more of my elder patents or co-pending patent applications, a piston 21 may reciprocate periodically in cylinder 20 and a piston shoe 23 may be interposed between piston 21 and piston stroke actuator guide 24. Traction rings 25 may embrace portions of the piston shoe 23 and the rotor 22 may have a shoulder 26. It was custom heretofore to bear the rotor or rotary member 22 in antifriction roller-needle or ball bearings with rolling parts like balls, rollers or needles between inner and outer bearing rings.

Such bearings however had a rather big size, when they should bear a heavy load and their life time was limited. It was also already applied to set hydrostatic slide bearings into a housing to carry a revolvable rotor therein. However, to lead fluid under pressure into the respective pockets of the hydrostatic bearings was difficult and commonly demanded a specific hydrostatic pump and complicated fluid lines.

With the arrangements of FIGS. 4 and 6 such difficulties shall be reduced and hydrostatic bearings are shown in accordance with this embodiment of the invention, which are small in size, effective in operation and which obtain the required hydrostatic pressure fluid in a most inexpensive and reliable way.

According to these embodiments of the invention, an inner bearing ring 9 is mounted on rotor 22 and may have a radial shoulder to be borne on the shoulder 26 of the rotor 22. The inner ring 9 has a cylindrical outer face 53 and the housing 27 has a cylindrical inner face 54 substantially at least partially radially of the outer face 53. The bearing bush 1 is inserted according to this invention, between the inner face 54 and the outer face 53. Bush 1 also is provided with the hydrostatic fluid pressure pocket 2 which is open towards the outer face 53. Pocket 2 extends along the periphery of the outer face 53 for commonly less than 180 degrees. This extension is placed in the direction to the load in the chamber 20 diametrically opposite of the axis of the rotor. The problem arising is, to transfer the pressure from the opposite high pressure chamber 20 into the pocket 2. This is preferred to be done, according to this embodiment of the invention, by setting passage 6 through the housing 27 to communicate it with the high pressure chamber 7 between two neighboring seats 34,37 of the control body 28 and to communicate the other end of passage 6 by a respective passage 5 through the bearing bush 1 to the fluid pressure pocket 2. This arrangement is a most effective one and it is convenient in manufacturing. When the bush and pocket 1 and 2 are properly located and dimensioned wherefore the Figure gives an example, and when the fluid is a good lubricating and dustfree fluid, like good oil, the life time of the bearing arrangement of this embodiment of the invention is almost limitless. Of further use is its good efficiency, little friction and its extremely small size. The size of this bearing is much less than the size of a bearing of the common ball-bearing, roller bearing or needle bearing types. The entire device is thereby building more compact with less weight.

When the bearing arrangement shall also carry an axial load, the fluid pressure pocket 3 is provided on the innermost end of the bush 1 and open towards the shoulder of bearing ring 9. The shoulder 9 there forms a radially plane face on its end, whereon the innermost radially plane end face of the bush 1 can slide. Fluid pressure pocket 3 is communicated by passage 5 to fluid pressure pocket 2. Proper dimensioning and location wherefore the Figure gives a sample, provides an almost eternal life of the axial bearing capacity of this arrangement.

In several practical applications, the bearing bush 1 is mounted axially moveable in housing 27. For that purpose a thrust chamber 4 is provided between the housing 27 and the bush 1. This thrust chamber 4 may be of a narrow radial dimension as shown in the Figures. The housing 27 may form a second seat 8 radially of the bush 1 with a respective cylindrical inner face corresponding substantially to a respective second cylindrical outer face on bush 1. Both second faces are closely fitting relatively to each other, but they are permitting an axial movement relatively to each other. The same applies to the first cylindrical inner and outer faces left of pocket or chamber 4 on the innermost outer portion of bush 1 and the neighboring housing portion. Respective plastic or deformable seals, like for example, O-rings, may be inserted in chamber 4 to seal the same. The already mentioned passage 7 may be communicated with chamber 4 and so so may the passage(s) 5 of the bush 1.

FIG. 6 demonstrates, that the pressure from an axially second chamber group 20 in rotor 22 may be led into third and fourth fluid pressure pockets 10 and 13 in bush 11 of FIG. 6. Thereby a double acting bush 11 is obtained, which evaluates pressures in two different working chamber groups 2 of a rotor 22.

The first fluid pressure pocket set 2,3 is similarily located and communicated in FIG. 6 as in FIG. 5. The passage 6 may be drilled in two steps for convenience of manufacturing, whereby one of the ends of the passage is then closed by pin or closure means 32. The second set of fluid pressure pockets, which shall be provided with the probably different pressure from the second working chamber group 20 in the rotor 22 of the device must however be communicated differently. The second axial fluid pressure pocket 13 and the second radial fluid pressure pocket 10, if so desired, are (is) therefore communicated by passage 15 to a second thrust chamber 14 and from there by passage 16 through a cover 30 to the other axial portion of the rotor 27 or to the opposite axial control body 27 on the other axial portion of rotor 22. The communication of passage portions 16 in the cover or housing 27 with the passage portion 16 in cover 30 may be sealed by a respective seal 32 and the cover 30 may be fastened by bolts or fasteners 31 to the housing or cover 22. This arrangement of FIG. 16 may therefore have two thrust chambers 4 and 14 with respective cylindrical seal face portions 54,55 and 56.

It might be noted, that this pump is especially suitable for hydraulic power shovel pumps with plural flows of separated fluid flows of different pressures out of the fluid flow producing means of embodiment of FIG. 6 of the invention.

The specifics demonstrated FIG. 4 in combination with FIG. 5 regarding the control body arrangement of control body 28 will be described later in this specification.

The arrangements of the invention of embodiments of FIGS. 4 and 6 may be described in short in the following definitions 10 to 17.

10. In a hydrostatic bearing device, a housing having a cylindrical inner face, a rotor including a cylindrical outer face and an arrangement to supply a fluid under pressure;

wherein an inner ring 9 is mounted on said outer face of said rotor 22 while said inner ring may be provided with a radially extending shoulder 26 to be axially borne on a respective portion of said rotor;

wherein a substantially at least partially cylindrical bush 1 is provided between said rotor and said housing and at least partially between said inner face and said outer face, wherein said bush includes at least one fluid pressure pocket 2 open towards said outer face, and, wherein a fluid line passage 6 is communicated through said housing from said fluid pressure pocket to a fluid flow supply means to supply fluid under pressure to said pocket.

Or,

11. The device of 10, wherein said passage 6 extends from said fluid pressure pocket 2 through said housing 27 to a thrust chamber 7 which is provided between two neighbouring seats 34,37 of a control body 28 in said housing 27.

Or,

12. The device of 11, wherein said housing 27 contains two cylindrical faces 8,54 of different diameters, said bush 1 has two cylindrical outer faces of different diameters, wherein said diameters of said bush are fitting into the said diameters of said faces of said housing, wherein said faces are permitting an axial movement of said outer faces along said inner faces, wherein a thrust chamber 4 is formed between the first and second faces of said faces and communicated to said passage 6, whereby said bush is pressed into close engagement with a substantially radial face which is subjected to be borne by a respective portion of said rotor 22.

Or,

13. The device of 12, wherein an axially directed fluid pressure pocket 3 is provided in said bush 1 and open towards said substantially radial plane face and communicated to said passage 6.

Or,

14. The device of 13, wherein said pockets 2 and 3 are communicated to each other by a passage arrangement 5 through said bush 1.

Or,

15. The device of 14, wherein a second axially directed fluid cylindrical pocket 13 is provided in said bush;

wherein a second thrust chamber 14 is provided between said housing 27 and said bush 1,11;

wherein said second thrust chamber 14 is communicated by a respective passage arrangement 16 to a second chamber group of working chambers in said rotor 22 and, wherein said second axially open pocket 13 is communicated by a respective passage means 15 to said second thrust chamber 14.

Or,

16. The device of 15, wherein said thrust chamber and said second thrust chamber are sealed by three inner and outer cylindrical face portions 54,55,56 along the respective portions of said housing 27 and said bush 1.

Or,

17. The device of 15, wherein a second fluid pressure pocket 10 is provided in said bush 1, open towards said inner ring and communicated to said passage arrangement 16.

In FIGS. 4 and 5 the control body 28 is substantially similar to the control body of my U.S. Pat. No. 3,850,201. The control bodies of my U.S. Pat. No. 3,850,201 have worked very satisfactory and are working satisfactory in the heretofore common applications. Presently however it is desired to increase the pressures and rotary velocities of the rotors in fluid machines, like pumps or motors to a much higher rate of pressure or speed. For example to pressures exceeding 5000 or even 10,000 psi.

At such high pressures, however, I have discovered, that my control bodies have a tendency to pivot under the friction between the control faces of the control body and of the rotor. Such pivotion, which is a pivotal movement, if it occurs results therein, that the centric and excentric faces are pressed together locally and the control body then sticks. It loses its ability to move axially and it loses its ability to adjust to the small round running mistakes of the respective rotor. The difficulty arising is, that such sticking of the control body occurs under a very steep angle, almost like a cone in the drilling machine spindle. Thereby the control body obtains a very strong self locking which is so strong, that, once it has occured, the control body becomes unable to soften or losening itself. The device is then improper in operation and welding, friction and leakage are appearing between the respective control faces.

The invention now discovers, that such sticking can be prevented even at very high pressures by respective improvements to the control body arrangement. FIGS. 4 and 5 are demonstrating such improvements in these embodiments of the Figures.

The first improvement is, that the diameter of the front seat 34 becomes radially bigger in diameter. The diameter of the front seat 34 is in accordance with this invention to be made 1.2 times plus/minus 0.1 times of the outer diameter 33 of the control face.

The second improvement is, that the gravity centre "gc", in this FIG. 5, the gravity centre "gco", does not become calculated any more by the equations of my mentioned patent, but by the equation:

$$gco = -(r_m^2 e)/(r_o^2 - r_m^2). \quad (1)$$

Therein "ro" is ½ of diameter 34 and "rm" is ½ of diameter 37.

The third improvement is, that the medial face which is normal to the medial face through the thrust chamber 7 and the control face on the front end of the control body 28 becomes turned six degrees plus/minus three degrees in the direction of rotation of the rotor and relative to the medial normal face to the medial face through the inner and outer death points, which means through the positions of largest and smallest volumes of the working chambers 20 in the respective rotor 22.

With these improvements the efficiency, life time and capability to work at higher pressures and relative speeds of the control body 28 is very much improved. Commonly one or more of these improvements single or in combination obtains the desired results.

When the control body builds however extremely long in axial direction, it is occasionally required to set an arresting means, which prevents rotation of the control body and thereby prevents pivoting of the control body 28. The here discussed FIGS. 4 and 5 now demonstrate, how an effective arrangement can be provided to the control body 28. Accordingly the control body 28 obtains a bore 40 with a first axis 43. Thereinto extends an arresting bar 41 with a second axis 42. The arresting bar 41 is borne in the seat 46 in the housing 27 and it is pivotable therein. A setting means 44 may be added to the bar 41 or be integral therewith. Setting arrester 45 may be utilized to finally set the arresting pin 41. It would be enough to spare the means 44 and 45, if the arresting pin 41 could be accurately set into the bore 40. However, commonly it is not possible to set the bar 41 exactly centrically into the bore 40. The present technology of machining makes this difficult and occasionally impossible.

Therefore the bar 41 is in this embodiment preferred to be provided with an eccentric portion 41 which is eccentric relatively to the axis 43 of its outer end portion in seat 46. Axis 43 of the mentioned outer end portion in seat 47 may be coinciding with the axis 43 of the bore 40. When the arresting bar 41 is pivoted in seat 46 by member 44, it finally touches, due to the eccentricity between axes 42 and 43 the respective portion of the wall of bore 40 and thereby prevents a pivoting of the control body 28 in the direction of rotation of the rotor 22. This is just, what according to this embodiment of the invention is desired. Once this meeting of portion 41 of bar 41 and of the wall of the bore 40 is reached, the setting portion 44 becomes arrested in this position of pivotion of arresting bar 41 by the setting or arresting means or bolt 45 relatively to the non-revolvable housing portion 27. The arresting of the control body 28 against rotation or pivotion in the direction of rotation of rotor 22 is now perfectly prevented in accordance with this embodiment of the invention. The control body 28 is now able to work at the highest pressures and rotary velocities of rotor 22. Details will also be understood from FIG. 5 which is a cross-sectional view through a portion of FIG. 4 along line V, and, wherein 38 and 39 are the control ports, while bores 49 and 50 are alternative locations for bore 40.

The embodiment here discussed may also be described by the following definitions 18 to 24.

18. A control arrangement for the control of flow of fluid through a housing 27 to at least one working chamber 20 in a fluid handling body 22, which includes at least one centric and at least one eccentric seat 34,37 of a control body 28 in said housing 27 or in said body 22 respectively with a thrust-chamber 7 provided between the respective portion of said housing and said control body 28 and with a stationary nonrotary and a rotary control face between said control body and said fluid handling body; wherein a prevention provision exists, and, wherein said prevention provision includes a means to prevent pivotion of said control body in said housing or in said fluid handling body respectively.

Or,

19. The arrangement of 18,
wherein said means consists in a relationship of 1.2 plus-minus 0.1 of the diameter of the control-face closest seat of the control body to the outer diameter of the control face of said control body.

Or,

20. The arrangement of 18,
wherein said means consists of the location of the gravity center "gco" of the control-face closest thrust chamber at a distance from the centric axis of the control body of a size corresponding to the equation: "gco"$= -(r_m^2 \times e)/(r_o^2 - r_m^2)$ with "ro" being the half of the diameter of the control-face closest seat 34 of said control body 28 and "rm" is the half of the diameter of the thereto next and commonly eccentric seat 37 of said control body 28.

Or,

21. The arrangement of 18,
wherein said means consists of the provision of the medial face normal to the face through the middle of said seats being turned six plus-minus three degrees in the direction of rotation of said fluid handling body 22 away from the medial face through the smallest and largest volumes of said working chambers 20 in said fluid handling body.

Or,

22. The arrangement of 18,
wherein said control body 28 is provided with a bore 40 which extends axially from the rear end of said control body deeply into said control body, and,
wherein an arresting bar 41 is extended from a portion of said housing 27 into said bore 40 in said control body to prevent said control body from pivotal or rotary movement around its axis.

Or,

23. The arrangement of 22,
wherein said arresting bar 41 is pivotably borne in a seat 46 in said housing 27 and provided with an eccentric bar-portion of an axis 42 which is excentric relatively to the axis of said portion of said bar which is borne in said seat in said housing,
while a setting portion 44 is provided to said bar 41 and fixed on said housing in a suitable position, and,
wherein said suitable position is defined by a meeting of a portion of the outer face of said bar 41 on a portion of the inner face of said bore 40.

Or,

24. The arrangement of 18,
wherein the definitions of 19 to 23 are applied in common to said arrangement in order to assure a most reliable and effective control body arrangement, capable of handling and controlling a fluid under very high pressure and at high relative velocities between between said rotary and said stationary control face.

Figure 7:
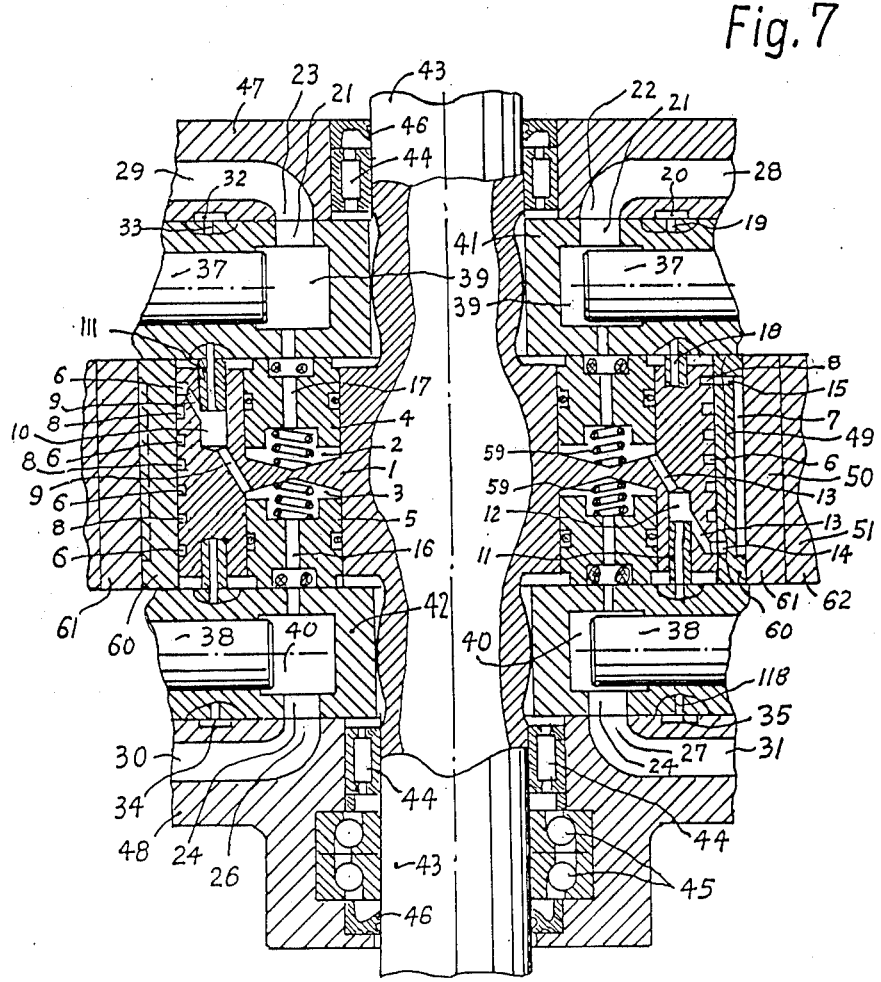
FIG. 7 is a longitudinal sectional view through a rotor, bearing and adjacent portions of another embodiment of a pump or motor of the invention.
Figure 8:
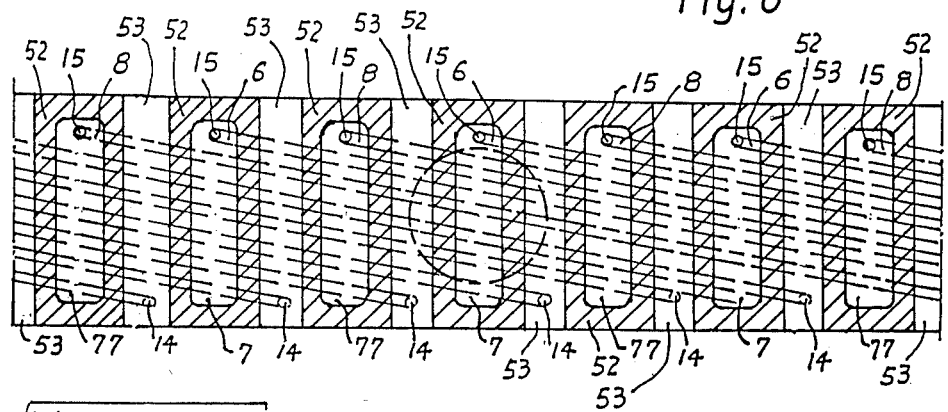
FIG. 8 is a "roll-up" peripherial sectional view through a bearing portion of FIG. 7, and illustrates an embodiment of the invention.
Figure 9:
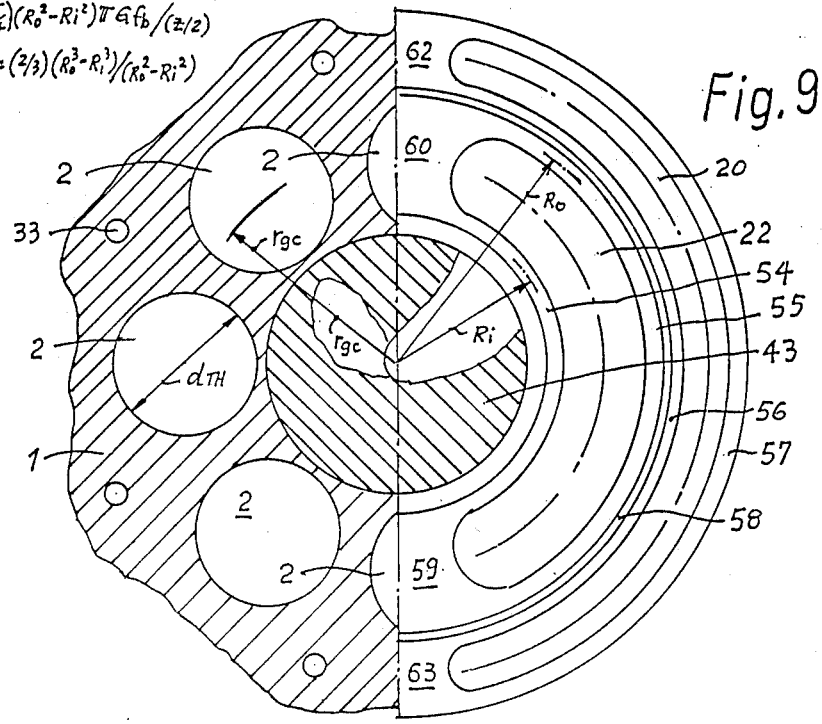
FIG. 9 is partially a view onto the control face and partially a cross-sectional view through the thrust arrangement of FIG. 7.

In FIGS. 7 to 9 a fluid handling device as for example, a hydraulic or hydrostatic pump or motor is demonstrated. It is closely related to the device of my earlier patent application Ser. No. 232,935 which was filed on Feb. 9th of 1981 as a divisional application of my earlier applications Ser. Nos. 910,805 and 911,246 which were filed on May 30th and 31st of 1978 respectively.

The devices of my mentioned co-pending patent applications have worked quite satisfactory at common applications.

However at present time it is now required to apply the devices to still higher pressures, relative speeds between adjacent faces and to higher differences in pressure in fluid in the different flows of fluid through the different working chamber groups of the respective devices.

I have now found, that the aim of still higher pressures in flows and of relative speeds between adjacent faces can be obtained only, when certain improvements are added to the devices of my co-pending applications. Such improvements are content of the present embodiment demonstrated in FIGS. 7 to 9.

Accordingly the improvements by this invention consists in the application of second passage- and seal means through the medial portion of the drive rotor to an opposite axial control face portion with a second fluid pressure balancing pocket therein.

Due to an other improvement by this invention, the diameter of the thrust pistons and of the thrust chambers wherein the thrust pistons are axially moveably located, must have a diameter substantially equal or slightly higher than the root of $(pi/4)(Ro^2-Ri^2)pi\ G\ fb/(Z/2)$.

And according to an other improvement by this invention, the axes of the thrust chambers and thrust pistons must be located on the integral medial radius "rgc" of the control face, while the said medial radius must correspond to the equation "gc"=$(\frac{2}{3})(Ro^3-Ri^3)$/$(Ro^2-Ri^2)$.

Thereby the following two equations should be obeyed in accordance with the respective objects of the respective embodiments of this invention:

$$d_{TH}=(pi/4)(Ro^2-Ri^2)pi\ G\ fb/(Z/2). \quad (3)$$

and $$r_{gc}=(\tfrac{2}{3})(Ro^3-Ri^3)/(Ro^2-Ri^2) \quad (4)$$

with pi=3,1416; G=face percentage, commonly about 0,5 and $f_b$=balancing factor, commonly about 1,06 plus/minus 0,04. While Ro and Ri are the medial radii of the sealing lands around the control ports of the control body as shown in the respective FIG. 9.

The Figures show further in detail, where the respective matters are located and the arrangement of the embodiments of these Figures may be written as definitions 25 to 30.

25. A hydrostatic device, which might be a pump or motor with a plurality of working chamber groups 39,40 arranged separately of each other in a respective rotor arrangement 41,42 axially of a medial drive portion 1 which revolves with shaft 43 to revolve said rotor arrangement; while reciprocating means 37,38 are arranged to operate with said working chambers 39,40 to periodically increase and decrease the volumes of said working chambers, when said shaft, drive portion and rotor arrangement revolve in unison and wherein axially directed thrust chambers 2,3 are arranged in said medial drive portion 1 with axially moveable thrust members 4,5 therein respectively; rotor passages 21,24 extending from said working chambers to control faces respectively with control ports 22,23, 26,27 provided in the stationary control faces respectively, fluid passages 28,29,30,31 extend from the control ports through the housing portions of housing 47,48 respectively, bearings of relative small size, 44,43 and seals 46 may be added to the said shaft 43 and housing portion 47,48 respectively, while said rotor portions of said rotor arrangement are pressed by said thrust chambers and thrust bodies against the respective control faces of said housing portions 47,48 to seal the control ports 22,23,26,27 respectively; and;

wherein means are added to the said device which permit the application of a balancing and lubrication action of the respective one rotor-arrangement portion in one axial portion of the device in the other axial portion of the device and the respective action of the rotor arrangement portion in said other portion of the device in the said one portion of the device.

26. The device of 25, wherein said medial drive portion 1 is surrounded by a closely fitting inner bearing ring 60 while said inner bearing ring 60 is surrounded by an outer bearing portion 61 with an outer face of cylindrical configuration on said inner ring and a cylindrical inner face on said outer bearing portion;

wherein said outer face is interrupted by fluid pressure pocket pairs 7,77 which extend into said inner ring and which are communicated by passage pairs 6,7 half way along the periphery of said medial drive portion to respective diametrical opposite chambers of said thrust chambers 2,3 and said working chambers 39,40 respectively with the first pockets 7 of said pocket pairs forming with the first passages 6,15,14 of said passage pairs as first communication and the second pockets 77 of said pocket pairs are forming with the second passages 8,15,14 a second communication, wherein said first communication contains pressure and fluid from one portion of the respective chamber(s) of said rotor arrangement and said second communication contains pressure and fluid from the respective chamber(s) of the other portion of said rotor arrangement, whereby each of said pockets is located between two pockets of fluid and pressure from an other rotor portion of said rotor arrangement;

wherein said pockets are closed by said inner face of said outer bearing portion 61 while said outer face of said inner bearing ring 60 is closely sealed along said inner face but able to revolve on said inner face in said outer bearing portion, whereby said shaft 43, said medial drive portion 1 and said rotor arrangement 41,42 are radially substantially pressure balanced between said working chambers 39,40 and said pocket pairs 7,77 to permit said shaft-,medial drive portion and rotor arrangement to revolve in said outer bearing portion 61 substantially free of radial load and radial forces.

27. The device of 25, wherein two control ports 22,23 are forming a first control port pair on one of said housing portions 47, the other two of said control ports 26,27 are forming a second control port pair on the respective other portion 48 of said housing while one set of rotor passages 21 of one portion 41 with working chambers 39 of said rotor arrangement communicates with said first control port pair and the other set of rotor passages 24 of the other portion 42 with working chambers 40 of said rotor arrangement communicates with said second control port pair;

wherein a third control port pair 20,32 is provided in said one of said housing portions 47 while a fourth control port pair 34,35 is provided in the other portion 48 of said housing portions; and, wherein third and fourth communications are provided to communicate said third and fourth control port pairs with respective working chambers in the remotest portion of said rotor arrangement respectively, whereby said third communication passes fluid and respective pressure therein from the working chambers 39 in said one portion of said rotor arrangement to said fourth control port pair 34,35 while said fourth communication passes fluid and pressure therein from said working chambers 40 in said other portion of said rotor arrangement to said third control port pair, whereby said rotor arrangement substantially floats between said control port pairs at equal and at different pressures in the respective control port pairs.

28. The device of 27, wherein said third communication is formed by and extends from the first thrust chambers 2 through said medial drive portion by passages 13 to third thrust chambers 12 with third thrust bodies 11 therein and with passages 118 through the respective rotor portion 42 of said rotor arrangement to the respective control port(s) 34,35 of said fourth control port pair 34,35; and;

wherein said fourth communicated is formed by and extends from the second thrust chamber(s) 3 by passage(s) 9 through said medial drive portion 1 to fourth thrust chambers 10 in said medial drive portion with fourth thrust bodies 111 therein and with respective passages 33 through the respective rotor portion 41 of said rotor arrangement to the respective control port(s) of said third control port pair 20,32;

while fifth and six passage communications 9 and 13 may be provided in said medial drive portion 1 to communicate said third and fourth communications with said first and second communications respectively.

29. The device of 28, wherein the arrangement corresponds to that of FIGS. 8 to 9 with the probability of additional provisions, like springs 59, passages 17,16 and other through the first to fourth thrust bodies 4,5,11,111 while the locations and relative inclinations of passages are substantially as shown in FIGS. 7 and 8.

30. The device of 25, wherein the diameters of said thrust chambers 2,3 and of said thrust members 4,5 are corresponding to the equation $$dth = (pi/4)(Ro^2 - Ri^2)/(Z/2);$$

while the axes of said thrust chambers 2,3 and of said thrust members 4,5, are located of the medial integral radius of the respective control port with said medial radius named "$r_{gc}$" and wherein said medial radius corresponds to the equation $$r_{gc} = (\tfrac{2}{3})(Ro^3 - Ri^3)/(Ro^2 - Ri^2);$$

whereby said thrust bodies 4,5 and thrust chambers 2,3 obtain a proper size and location to assure the tight sealing of the respective control ports 22,23,26,27 but an overpressing between the respective control faces and local leakages and frictions between said control faces surrounding said control ports are prevented, while in said equations "dth" means the diameter of the thrust chambers 3,4 and of pistons 4,5; wherein pi is 3,1416; wherein "Z" is the number of working chambers 39 or 40 in the respective portion of the rotor arrangment, corresponding to the number or first or second thrust chambers 3 or 4, wherein "rgc" is the integral medial radius of the respective control port 23,22,26,27 and the respective sealing land therearound with "Ro" the medial radius of the outer sealing land portion and "Ri" the medial radius of the inner sealing land portion, respectively.

Figure 10:
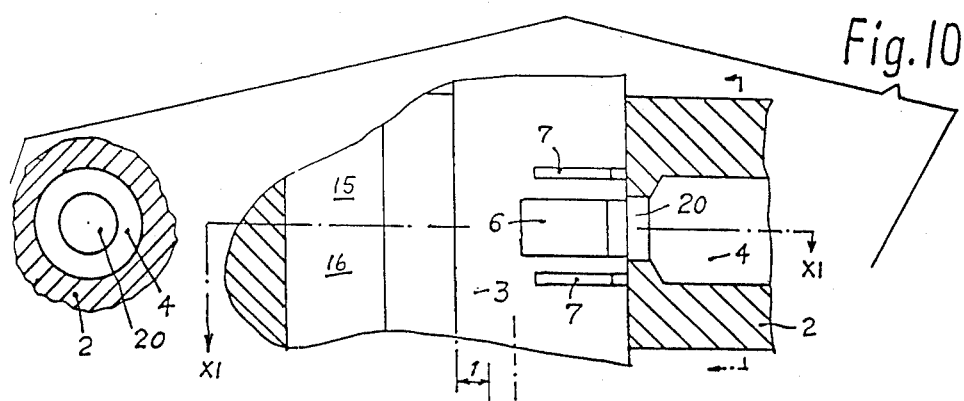
FIG. 10 is a longitudinal sectional view through a portion of a rotor with a view onto a portion of a control body therein and with a cross-sectional view in the left portion of the Figure along the arrow in the right portion of the Figure.
Figure 11:
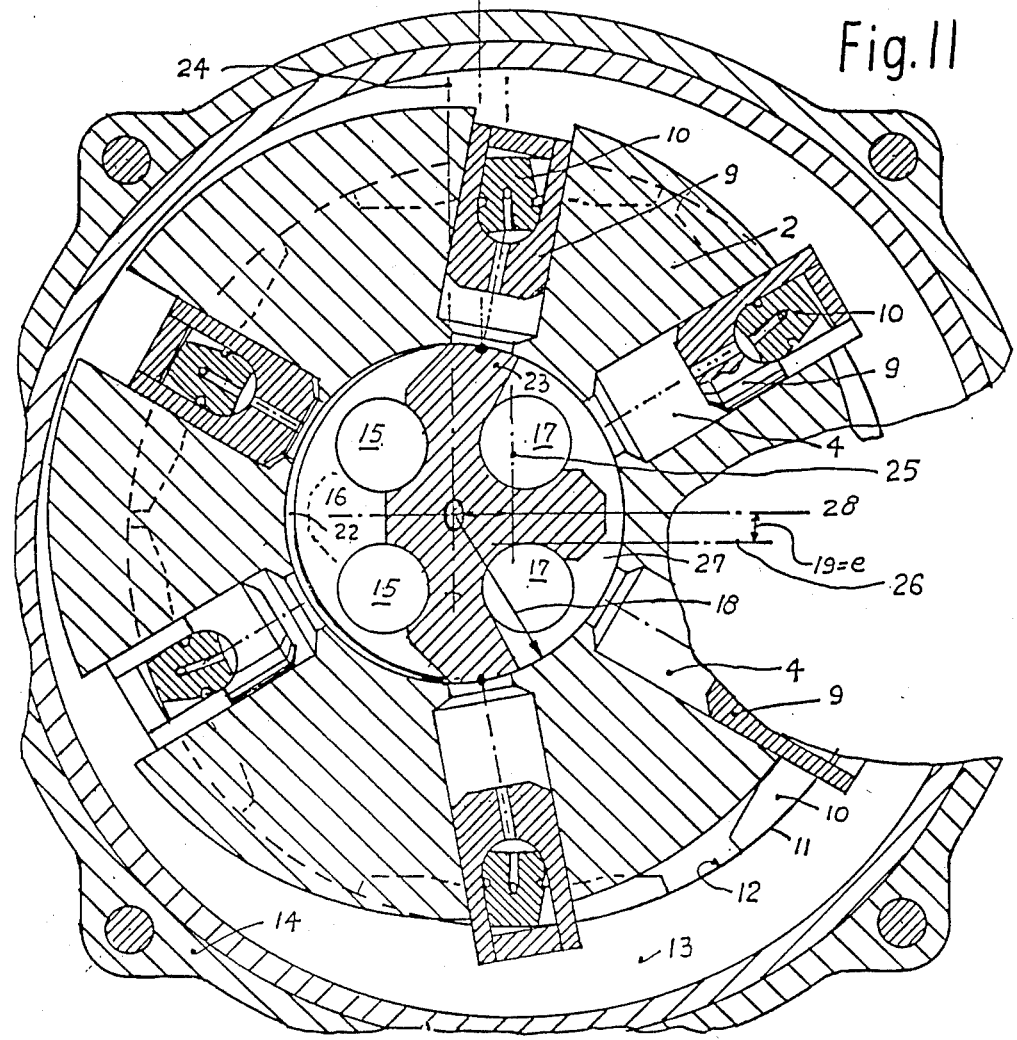
FIG. 11 is a cross-sectional view through a device of FIG. 10 and illustrates the distancing of the axis of the stroke guide in two different dimensions away from the axis of the rotor and is thereby illustrating another embodiment of the invention.

In FIGS. 10 and 11 an embodiment of the invention is demonstrated, which deals with a novel location of the axis of the rotor to improve the control of flow and to silence the pump or motor.

Common to the technology which is known in the art of my earlier patents or applications, the rotor 2 has substantial radial cylinders 4 with pistons 9 periodically reciprocating therein. Piston shoes 10 are interposed between the pistons 9 and the piston stroke actuator ring 13. The piston shoes 10 have outer faces 11 which are sliding along the inner face or piston stroke guide face 12 of diameter "da" provided on piston stroke guide or piston stroke actuator 13. The rotor 2 is revolvably borne in housing 14 and the piston stroke guide 13 is also provided in housing 14. The rotor 2 has a central rotor bore, called the rotor-hub, wherein the control body 3 is located. Control body 3 has intake passages 15 and exit passages 17. The exit passages may become intake passages and vice versa, when the device is reversed from pump to motor. Control body 3 has a high-pressure control port 6 with sealing lands therearound and the unloading recesses 7 in the control body 3 at certain axial distances from control port 6. The cylinders 4 have narrow rotor passages 20 of a smaller diameter than the diameter of the cylinder 20 is. This is visible in FIG. 10, wherein the left portion of the Figure is a cross-sectional view through the right portion of the Figure, along the arrow in the right portion of the Figure. The Figures are showing respective portions of a respective pump or motor. FIG. 11 corresponds to FIG. 10 as a cross-sectional view through the right portion of FIG. 10 along the line XI—XI. Between the cylinder 4 and the narrower rotor passage 20 a cylinder bottom portion appears, whereonto the pressure in fluid in cylinder 4 acts to press the cylinder bottom and thereby the rotor 2 against the outer face of control body 3 to tightly seal the high pressure control port 6 as far as possible. The contrary directed forces onto the bottom of cylinder 4 and onto the inner face of the rotor hub out from control port 6 and the sealing lands therearound is respectively considered in the design of the device. The eccentricity between the axes of the rotor and of the guide face 12 and actuator 13 is "e" and shown by 19, whereby the stroke of the pistons is 2 times "e" at the inward stroke and 2 times "e" at the outward stroke of pistons 9. There is one inward stroke and one outward stroke per piston 9 and shoe 10 at each revolution of the rotor 2. So far the arrangement is known in the art.

It has also been tried in one of my mentioned earlier applications, to press the rotor 2 and the control body 3 together to each other in the high pressure area. A wider clearance 22 appears then between rotor and control body 2 and 3 in the low pressure area. The strengthening poriton 16 of the control body 3 which is shown by dotted lines in FIG. 11 may be spared in the low pressure area in order to make space for a smooth and slow suction or low pressure flow.

In such arrangement, for example, as in my mentioned co-pending application(s) the sealing faces between rotor 2 and control body 3 are defined by radius 18 and it has now been discovered in accordance with this present invention, that such devices are rather noisy, because the change from low pressure to high pressure is appearing too suddenly when the cylinder 4 and piston 9 are moving over the closing arch 23.

The invention aims to overcome this problem and to provide a pump or motor with a smoother and more silent operation. This is done thereby, that the center of closing the rotor passage 20 is removed from the medial plane 24 of the device by the distance 1 towards the right pressure half-side of the device. To obtain this, the axis of the rotor 2 is moved by the distance 20° away from the axis of the housing 14 or from the axis of the actuator or guide body 13 with inner stroke guide face 12. The center line of the rotor 2 and thereby the axis of rotor 2 is now located by "0" wherefrom the radius 18 starts. The medial plane through the inner and outer dead points of the piston strokes which is in other words the medial face through the positions of smallest and largest volumes of the cylinders 4 is now located in plane 25 but not any more in plane 24 of the former art. The piston stroke follows the medial plane 25 along the eccentricity "e" between points 20° and 26. The closing arc 23 now has already closed the respective rotor passage 20, when the outer or inner dead point of the piston 9 is reached, while at the former are the respective passage 20 was still partially open to the low pressure half, when the said dead point of the respective piston 9 was reached. A proper build up of pre-compression of fluid in the respective cylinder 4 was therefore not possible in the former art, but it is now possible by extending the closing arch 23 in the direction of rotation into the high pressure half of the device. Thus, the invention provides a proper pre-compression in the fluid in the closed cylinder 4 before the cylinder becomes connected by the rotor passage 20 to the high pressure port 17-27. The negative influence onto this operation by the wider clearance 22 is prevented by the present invention.

The invention of this embodiment may also be described by the following definition 31.

A hydrostatic or pneumatic pump or motor including a housing 14 with a rotor 2 revolvingly borne in said housing 14 and having substantially radialy expanding and contracting working chambers 4 therein, a centric bore in said rotor, called "hub", a substantially cylindrical control body 3 in said rotor-hub with a high pressure half closely fitting with an outer face portion of said control body on an inner face portion of said rotor-hub and a displacement stroke actuator 13 with an inner stroke guide face 11 and with a stroke-guide axis 26 distanced by the eccentricity "e", 19, from the axis "0" of the rotor, wherein a medial plane 25 defines the plane through the inner and outer dead points of the displacement means 9,10 and thereby runs through the locations of the greatest and smallest volumes of said working chambers 4, as far as until here described known from the former art of my respective co-pending application and from my German DOS No. 29 21 765;
 with the provision of a novel improvement;
wherein said novel improvement consists in the location of said medial plane 25 through said outer and inner dead points is distanced from the axis 0 of said rotor 2 in the direction 20° into the high pressure half 17,27 of said device;
 whereby the respective rotor passage 20 to the respective working chamber 4 in said rotor 2 is completely closed and uncommunicated from the low pressure half 15,16,22 of the control body 3 when said displacement means 9,10 reaches the location of its outer dead point during revolution of said rotor;
 wherewith it is made possible to extend the closing arc 23 of the control body 3 effectively in the direction of rotation of said rotor into said high pressure half 17,27 of the device in order to obtain a proper pre-compression in the fluid in the respective working chamber 4 when said closed working chamber moves during revolution of said rotor 2 over said closing arc 23.

In FIGS. 12 to 19, 22,23 and 34 embodiments of disc-spring arrangements are illustrated, which are closely related to and which are continuation-inventions of my earlier patent application Ser. No. 224,769 which was filed on Jan. 13th, 1981.

Figure 13:
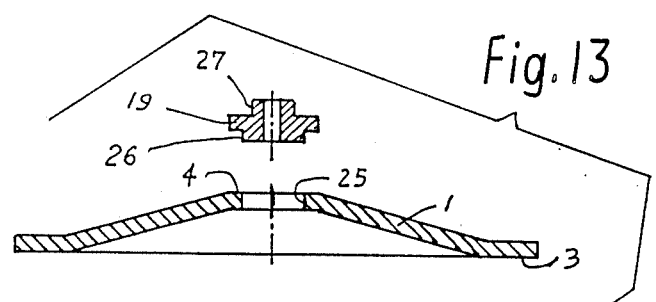
FIG. 13 is a similar longitudinal sectional view through a related embodiment of the invention.

Referring first to the details showing and separated parts showing drawing of FIG. 13; the disc spring of my invention is shown by referential 1. The specifics of my disc spring 1 are, that they are provided with the flat plane end faces 3 and 4 on the bottom outer end and on the top inner end. The spring 1 may also have an inner centering set 25.

With this spring I can pump a fluid in the range, which I am calling the sub-critical range of the pump's disc spring 1. This sub-critical range is limited to operation below the sub-critical pressure in fluid. At this sub-critical range the spring 1 is strong enough to resist the axial forces of fluid onto the spring 1 without departing from a seat, whereon the disc spring may lay and seal with flat plane face 3 and/or 4.

The disadvantage of a single disc spring in a pump, compressor or motor is, that the efficiency of the device becomes very low. The fluid acts in axial direction with pressure against the spring, and the spring resists this pressure by the spring capability of the material of the spring, for example, of the spring steel. To pump with a single disc spring, the spring must be stronger restisting, than the entire area of pressure loading supplies fluid pressure. Therefore, the pressure in the fluid will at all times remain in this sub-critical range so low, that only less than half of the axially directed force, which shall move the fluid axially in a pumping stroke, can be used to pump fluid, while at least or slightly more than the other half of the said force is used to compress the spring in the sub-critical range of my invention. Consequentely, the efficiency of the single spring in a pump in the sub-critical range remains at all times below 50 percent total efficiency.

My first means to overcome this problem, is, to set a second spring 1 onto the first spring 1 and mount the second spring diametrically opposed to the first spring 1, whereby a pumping space is formed between the two springs 1 and 2. The axial thrust force required to pump, is now the same, because the compression of the two springs requires only the same force as the compression of the one spring 1 does. But the delivered fluid becomes the double amount.

The length of the way of compression however is now doubled compared to the single spring. Consequently, the force has remained equal, but the way of stroke has doubled, so, that in overall, a better efficiency of the compression or thrust arrangement is obtained, but the power amount required in the springs 1 and 2 has not much decreased compared to the ratio of power to the fluid pumping relatively to the one single spring 1.

If the pressure in the fluid decreases over the critical pressure between the sub-critical stage and the super-critical stage, the fluid force onto the spring 1 and/or 2 becomes so high, that the spring 1,2 deflects and escapes with its respective end seat face 3 or 4 from its seat in the pump. The pumping chamber below the respective taper of the respective disc spring 1 or 2 then opens and the pumping action is disturbed. The pump experiences a big leakage of fluid and returns to the sub-critical stage.

Figure 12:
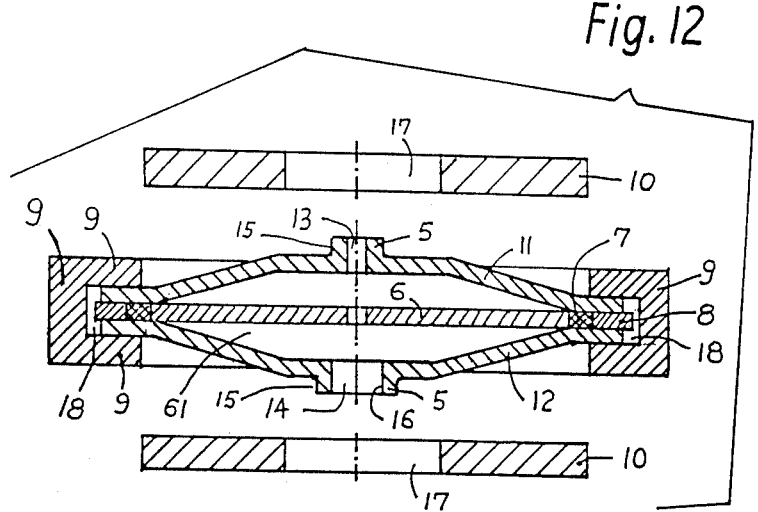
FIG. 12 is a longitudinal sectional view through parts of a disc-spring assembly of an embodiment of the invention.

With this knowledge obtained from the present invention, I now arrange the super-critical stage disc spring arrangement of FIG. 12.

In FIG. 12 disc springs 11 and 12 are laid together similarily with opposite direction as shown by 1 and 2 in FIG. 13. I prefer to lay the outer plane faces 3 onto a plane ring 8. Plane ring 8 is an outer ring. In the interior of the outer ring I prefer to lay a seal, for example an O-ring 7. Inside of the o-ring 7 I prefer to mount an inner ring 6 of equal this thickness as the outer ring 8 has. This inner ring 7 acts at the same time as a dead space filler to prevent dead space in the pump chamber 61. For high pressure this dead space filler 6 is important, because when it is not assembled, the fluid would compress in the then hollow space and that would result in a delivery and efficiency loss. Plate 6 becomes a respective at least one passage to pass fluid from the both chamber halves in chamber 61 to the other halves. I prefer to drill a bore of small diameter into the middle of the inner plate 6. If the diameter of this bore is too big, I experience a respective compression loss. But if it is too small, the pump will have respective losses by friction, turbulence and vortices in fluid.

The most important portion of the arrangement of FIG. 12 is the provision of the clamping arrangement 9 of the invention. Clamping arrangement 9 has an inner space 18 which is flaked by inwardly extending ring-arms 9A, 9B, which are embracing the outer radial portions of the disc springs 1 and 2. Thereby the springs 1 and 2 or 11 and 12 are clamped together or kept together in axial direction. It is important, that the clamping arrangement 9 is strong enough to resist its own deformation. The higher in the super-critical stage of high pressure the pump shall operate, as stronger must the clamping arrangement 9 be. It must at all times remain so strong, that the springs 11 and 12 can not depart from the outer ring 8 therebetween. Because, if they would depart, the seal 7 would enter the clearance produced by the departure. There the seal would then stick and the pump can not work normal any more.

Also important is in actual design and manufacturing is, that the interior annular ring groove 18 is radially wide enough to provide a space radially outwards of the outer ends of springs 11 and 12. Because by pumping and thereby compressing the springs 11,12 the outer diameter of the springs 1,2,11,12 is slightly increasing. Thus, when there is no space radially outward of springs 1,2,11,12, the clamping arrangement 9 would with its medial portion prevent the radial enlargement of the springs 11,12 and thereby it would prevent the compression and the pumping action of the springs 11,12.

The interior space 18 should also be radially wide enough to permit the respective radial expansion of the outer ring 8 in it. Outer ring 8 should be radially wide enough to withstand the pressure from the fluid in the inside in order to prevent breaking of ring 8.

In practice I often add a centering arrangement to the springs 1,2,11,12 of the super-critical range to center multiple disc springs 1,2,11,12 axially behind each other. Because this will bring good efficiency increases. FIG. 13 shows centering seat 25 whereinto a centering body 19 may be inserted with centering set 26. Centering body 19 may have a second centering seat 27 on the other axial end thereof. Seat 27 may fit into the third centering seat 29 of a second centering body 20 and the fourth centering seat 28 on the other end of the second centering body 20 may fit into seat 25 of disc spring 1. With the utilization of the centering bodies a number of disc-spring pairs 1,2 can become assembled axially behind each other.

FIG. 12 demonstrates additionally, that the centering bodies can be spared by providing centering portions and seats 5,15,16 on the disc springs 11,12 whereby the disc springs and centering bodies are becoming integral parts. In any case however, the centering bodies 19,20 or the centering portions 5 of the respective disc spring 1,2,11,12 must have a passage 13,14 to permit the flow of fluid into and out of the pumping chamber 61 between the disc springs of the disc spring pair.

To prevent an axial deformation of the respective disc springs 1,2,11,12 by a belly-configuration under very high pressure in the fluid, the ring plates 10 should be laid onto the axial outsides of the respective disc springs 1,2,11,12. The ring plates 10 should have an interior medial bore 17 to contain the respective centering portion of centering body 5,19,20 and probale seal means.

Figure 34:
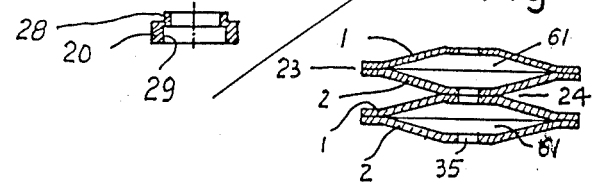
FIG. 34 is a longitudinal sectional view through a still further embodiment of a disc-spring chamber of the invention.

Below FIG. 13 the FIG. 34 is shown. This illustrates a disc spring assembly of the invention for a bright future and mass-application, because it is simple and requires only little space. In this embodiment of the invention, the disc springs 1 and 2 of FIG. 13 are made of a glueable material with spring steel action capability. I prefer to make these springs 1,2 of carbon-fiber material. This material acts in the same way as a metallic disc spring, which would be made of spring steel. But this material has the feature, that it can be glued together by adhesive material; e.g. by epoxy resin. If glued together by faces 3 at location 23 and with faces 4 by location 24, a respective disc spring pair is fastened strongly together and does not require the more expensive clamping arrangement of FIG. 12. By gluing places 24 with faces 4, a multiple disc-spring assembly of multiple or plural disc spring pairs can be made. This is demonstrated in FIG. 34.

Since the clamping of FIG. 12 or the gluing of FIG. 34 now holds the radial outer ends of the disc springs of the respective pair together, these assemblies are now able to operate in the super-critical range. The pressure in the pumping or motoring chamber 61 can now become very high and exceed the sub-critical pressure.

The force required to compress the spring(s) 1,2 can now in the established super-critical range of my invention become smaller than the force to deliver fluid or to consume fluid in a motoring action. The force required to compress the springs may even become negligibly small compared to the force to pump or the force experienced in a motor. The efficiency of the pump or motor can thereby become increased very considerably and can reach higher values than 90 percent overall efficiency. It is seen also here, how important the inner ring 6 is to prevent internal compression in fluid and how important the ring plates 10 are to prevent undesired deformation of the springs 1,2. The assembly of FIG. 34 does however not need the ring plates 10, because in this assembly, the springs 1 and 2 are assisting each other against fatal deformation.

In this regard it is also to be considered, that the disc springs 11 and 12 in FIG. 12 will cause a friction, when the ends thereof are moving radially—if only slightly—within the cl arrangement 9. To spare this friction and to obtain a better efficiency I am applying in practice often the arrangement of FIG. 14. The clamping arrangement 9 is made by three rings 89 to 90, which are clamped together by bolts 92 in threads 33. However, the rings 89 to 91 are separated into ring segments A,B,C etc., as shown in FIG. 15. This separation of the rings 89 to 91 into segments A to X is done to prevent the appearance of friction between the clamping rings 89 and 91 and the outer portions 3 of the disc springs 1,2.

FIGS. 16 and 17 are now showing, that a practical solution should be added to prevent an escape of the segments 89 and 91 A,B,-X from the disc springs 1 and 2. Accordingly, FIG. 17 demonstrates an annular groove 30 in the radial outer portion of disc spring 1 or 2.

FIG. 16 illustrates the application of a finger-like ring segment portion 31 which extends axially away from the plane face 32 to enter into the respective ring groove 30 of the respective disc spring 1 or 2. Such keeper portions 31 are provided on clamping rings 89 and 91.

In practical application I am applying this system to disc springs of hardened steel and also harden the ring segments of rings 89 to 91 accordingly. The machining should be made accurately in order that no too deep a ring groove 30 would disturb the strength of the spring 1 or 2. In practical application I am utilizing this embodiment of my invention to pump water in the pumping chambers 61 of FIG. 14 with a pressure of 10,000 to 40,000 psi. At the same time I am keeping the water separate from the other fluids in the deivce of FIG. 14.

In case of application of the arrangement of these FIGS. 14,16,17,15, the force required to compress the springs 1,2 is very small compared to the force required to pump the fluid or water with such a high pressure. This arrangement acts at such high pressures in the fluid very deeply in the super-critical stage or range of my invention. Consequently, the very high efficiency of the super-critical range compared to the very low efficiency of the sub-critical range is effectively and reliably obtained by this embodiment of the invention.

In the sample of an embodiment of the invention of FIG. 14, which embodies the capability of operation in the super-critical range of my invention, the pump in the right portion of the Figure is driven by my fluid motor in the left portion of the Figure.

Motor rotor 113 has radial cylinders 116 with pistons 117 reciprcating therein. Piston shoes 119 are interposed between the pistons 117 and the stroke guide arrangement 121. The motor is contained in housing portion 148. The pump is contained in housing portion 130. The driving fluid is supplied into the motor and cylinders 116 through control body 120.

Motor and pump have a common axis 97, but there may be different axes 97, especially when a speed reduction gear is assembled between the motor and the pump. The shaft is revolvingly borne in bearings 114 and provided with the eccentric cam ring portion 55. But 55 may also be a separated cam ring, mounted onto the respective shaft. Housing portion 48 is provided with a head cover 48 which has the inlet and outlet passages 122 and 123 to the inlet valve 50 and the outlet valve 49. Springs 51 may be provided to hold the valves closed at times, when they should not open. Head cover 48 also has the first seat for holding the disc spring 1 with a respective seal seat 39 and seal 40 therein, as shown in an enlargement in FIG. 23 to set the seat and the disc spring 1. Outer ring plate 6, inner ring plate 6 and the seal 7 therebetween are assembled as in FIG. 12 and the clamping arrangement consisting of the ring segments 89,90, and 91 A to X are assembled, as already discussed. The disc spring 2 is borne with its inner portion on pump-piston 94. Disc spring 1 is provided or attached to the seal 38 for example, in seal seat 37 as shown in an enlargement in FIG. 22. This seal may replace seal ring 7 if so desired. Springs 2 may have the same seal arrangements as springs 1 of FIGS. 22 or 23. In any case, the bottom disc spring 2 is sealed against piston 94.

Piston 94 may be provided iwth a spring containment space 88 for the closing of the inlet valve 50. Piston 94 may also have a seat or bore for a centering pin 87. Centering pin 87 may extend into the exit valve passage and thereby prevent rotation, dislocation or pivoting of the piston 94. Between head cover 48 and piston 94 is the pumping or working chamber 61 provided. It should be understood, that the ends of piston 94 and of head cover 48 should be suitably dimensioned to prevent dead space in chamber 61, when the springs 1,2 are respectively compressed.

In a practical application I am running the cam ring 55 of the pump with approximately 500 rpm and compress the springs 1 and 2 less than 50 percent of their strokes in order to obtain a long life of the springs. Two million strokes are possible at these rpm and stroke ranges. When the springs 1,2 are compressed at the degree of rate compared to maximum of stroke, the end faces of piston 94 and of head cover 48 should meet or be so close, that dead space in chamber 61 is only a minimum or entirely prevented. At higher rotary speeds and rates of strokes compared to the maximum of stroke of the disc spring, the life time of the device will become drastically reduced. This matter is also one of the reasons, why I am preferring a fluid motor to drive the pump. Because the fluid motor can give the desired rpm, what an electric motor or a combustion engine commonly does not do without the application of a speed reduction gear.

Between eccentric cam 55 and the piston 94 is the piston shoe 52 located. It slides on the outer face of cam 55 and the respective other end face of piston 94 swings or pivotes in the other end face of piston shoe 52. Fluid pressure balancing recesses and sealing lands therearound, forming hydrostatic bearings are applied to both radial ends of the piston shoe 94 in order to make the very high forces of tons of load in the size of the Figure possible at less friction and wear. The lubrication—and balancing—fluid is commonly oil and it is introduced into the respective fluid pressure balancing pockets 74 over respective passages 74 by a fluid flow supply pump over passage 95. Thrust bodies and seal plate portions 115 are sealing the supply of the lubrication—and balancing—pressure fluid, for example oil, into the piston shoe 74.

Figure 22:
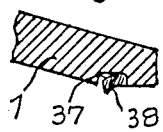
FIG. 22 is a sectional view through a disc spring portion of the invention.
Figure 23:
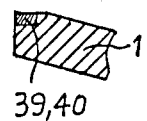
FIG. 23 is a sectional view through a disc spring portion of the invention.

FIG. 18 illustrates an embodiment of the invention which shows a most simple and inexpensive pump or motor for the sub-critical range of my invention. The stroke guide 99 has the inner guide face 156 and it may also be the housing of the device. It may also have an outer inlet passage 101 for the supply of fluid or for the suctioning of fluid into the multiple working chamber 61. Otherwise the fluid may enter into chamber 61 through the inlet passage(s) 105 and inlet control port 150 of an interior control body 102. The fluid will leave the chamber 61 through a respective exit valve as shown in other Figures or through the exit passage(s) 106 and exit control port 149 of said control body 102. An inner bore 104 in control body 102 may extend through the control body 102 and through the entire device. The simplicity of this device exists in the application of the simple sub-sonic disc spring arrangement, which may contain seals as shown in FIGS. 22 and 23 and which are shown by 37,38,39,40 in the Figure on the respective portions of disc springs 1 and 2.

The other simplicity and thereby feature of this Figure is, that there are not slidingly fitting faces around the pump chamber 61, especially; the close fitting of a piston in a cylinder is spared in this embodiment. The rotor 98 has simple outcuts 22 which losely guide on their wall faces 107 the respective disc-spring assembly. The innermost disc spring is laid onto the bottom of the respective outcut 22. The outermost disc spring of the disc spring set is laid onto the bottom seat portion of the piston 36. Piston 36 has also an inward extension 109 with passage 74 to guide the disc springs 1,2 of the assembly and to lead fluid into and out of chamber 61. The outer end of piston 36 has a bearing bed 110 wherein the piston shoe 21 is borne and able to swing or pivot therein. Respective passages 74 may be provided in the piston shoe to draw fluid from entrance space 101 or to send fluid into the balancing and lubrication pocket 112.

Since this arrangement does not require closely fitting pistons in cylinders, the manufacturing can be done with rough tolerances. At the present state of technology, only the inlet valves and exit valves or the respective control body must fit. But the other parts can be cast to accurate configuration. For example, the pistons, the rotor, the piston shoes, thereby 36, 98,21, can be cast by lost wax process or shell molding respectively. There need not be much machining thereafter. A little lapping at assembly of the deivce and here and there a drilling work for a passage bore is often enough to build this device. The embodiment may thereby also work with water or even with dirty fluids, if so desired and built.

Figure 19:
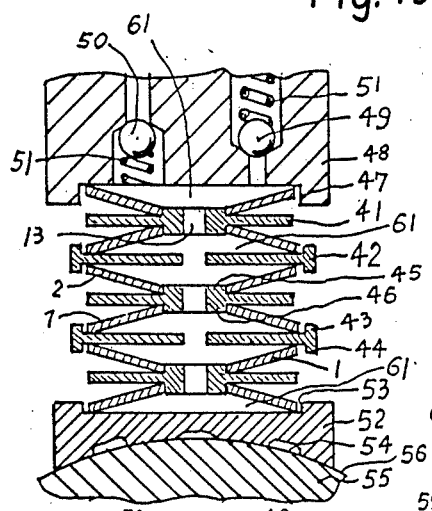
FIG. 19 is a longitudinal sectional view through an embodiment of the invention.

In FIG. 19 a still further embodiment of a disc-spring pump of my sub-critical range is illustrated. It has a head 48 with inlet and outlet valves 50,49 which may be spring 51 assisted. It also has a piston stroke drive cam 55 whereon the piston 52 slides.

The specifics of this arrangement are, that the head 48 is provided with a disc spring seat 47 and the piston 52 is provided with a second disc spring seat 53. Pump, or motor chamber 61 acts as in the other Figures and so do the inner passages 13. New compared to the other Figures is in this embodiment the application of inner centering bodies 41 and of outer centering bodies 43 between the respective disc springs 1,2. The inner centering bodies 41 are similar to bodies 19 of FIG. 13, however they are extending with their medial portions radially outwardly to form there portions, which are constituting the ring portions 10 of FIG. 12. The inner centering bodies 41 are thereby a combination of bodies 19 of FIG. 13 with ring plates 10 of FIG. 12. The outer centering bodies have axial extensions 43 and 44 which forms seats to keep the radial outer ends of the respective disc springs 1,2 and they are also having a medial radial inwards extension, which replaces the rings 6 and 8 of FIG. 12. Respective seals 37,38,39,40 of FIGS. 22 or 23 may be provided, if so desired.

Figure 20:
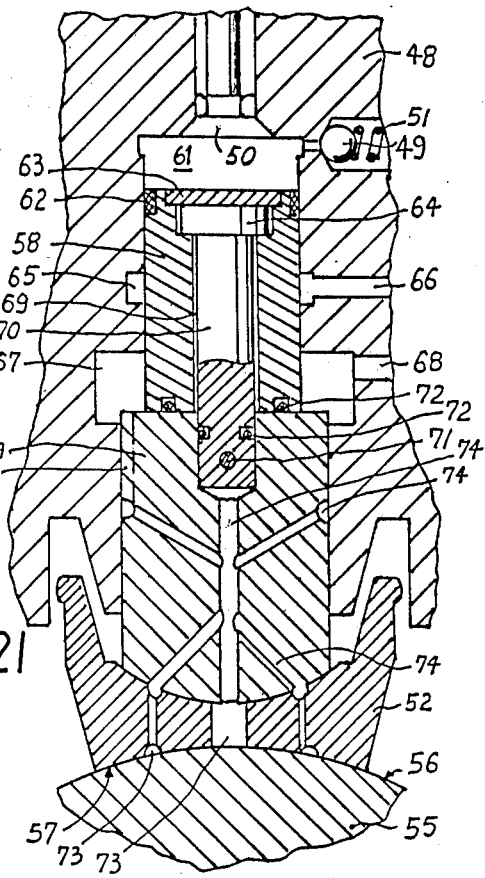
FIG. 20 is a longitudinal sectional view through an embodiment of the invention.

In FIG. 20 the body 48 contains a working chamber 61 with a reciprocating piston 58 closely sealing and reciprocating therein. Piston stroke actuator 55 has an eccentric outer face 56 to bear thereon the inner face 7 of piston shoe 52 and thereby to drive and guide the piston shoe 52, the second piston 59 and the first piston 58. The first piston 58 is laid with an end face onto the respective end face of the second piston 59. This is done in order, that the first piston may be radially to the axes of the pistons displaced. Because a precise equal axis of the cylinders and pistons 58,52 can not be guaranteed by machining, when the diameters of the first and second piston are different. To further permit the radial displacement of the pistons relatively to each other and radially to their axes, the first piston 58 has a bore 69 axially along the piston's axis. A pin 70 is of smaller diameter than the bore 69 and located in the mentioned bore 69. Holding pin 70 has a pin head 64 to be located and borne in a respective seat in the first piston 58. The seat may be sealed by seal cover 63 against the working chamber 61. Seal 72 may be provided in one of the pistons 58 or 52 to seal between them.

The holding pin 70 also extends into a respective bore into the second piston 59. It is fastened therein and in piston 59 by a respective fastener 71. A further seal 72 is often inserted between the second piston 59 and the holding pin 70. In this arrangement the first piston 58 is a pumping or motoring piston, in short the fluid handling- or working-piston, while the second piston 59 is a drive piston.

Respective fluid pressure pockets 73 are commonly provided between the drive guide 55 and the piston shoe 52 as well as between the drive piston 59 and the piston shoe 52 in order to enable a high radial load under little friction at operation between them. That permits the possibility of vey high pressure in the fluid in working chamber 61. Passages 74 are leading the respective lubrication—and balancing—fluid under a respective and often very high pressure into the fluid pressure pockets 73.

While the inwards stroke of working piston 58 is driven into the chamber 61 by drive piston 59 and piston guide 55, the outward stroke of the mentioned first and second pistons 58,59 may be driven by a respective pressure in fluid in drive chamber 67, which borders the ends of the drive piston and of the working piston. Since drive piston 59 has a bigger diameter than the working piston 58 has, the pressure in chamber 67 drives the drive piston downwards at an outwards stroke, while pin 70 with its assembly means draws the working piston 58 along the way together with drive piston 59. Fluid under pressure is led into drive chamber 67 by passage 68. For example, from a respective other accessory pump.

The arrangement of FIG. 20 serves especially to pump a non-lubricating first fluid in chamber 61. For example, water. The second fluid in chamber 67 is often a pure drive fluid, for example oil. This embodiment further demonstrates an other embodiment of the invention, which is the application of the dirty-fluid collection chamber 65 with dirt fluid exit passage 66. When the seal 62 is not tight, which occasionally occures after long operation under high pressure, the first fluid might escape through the clearance between the outer face of the first piston 58 and the inner face of the cylinder wall, whereon the piston 58 slides. A mixture of the first fluid with the second fluid would then appear. That would disturb the cleanliness of the first fluid and also the cleanliness of the second fluid. For example, it would mix the oil with the water. Such mixing is prevented by the application of the dirty fluid collection chamber 65 around the first piston 58 and by passing the dirty fluid away through dirty fluid exit chamber passage 66.

Figure 21:
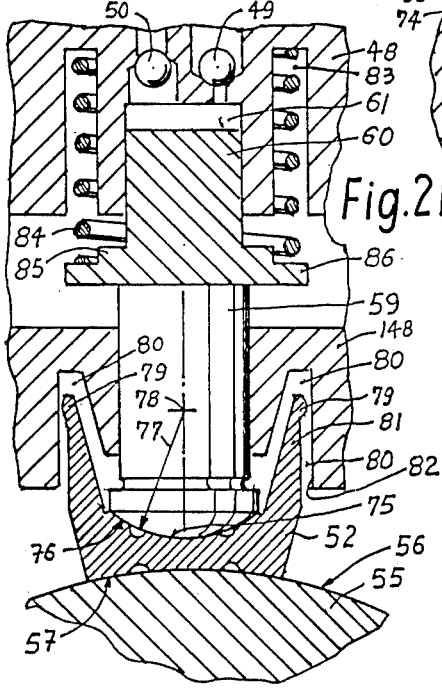
FIG. 21 is a longitudinal sectional view through an embodiment of the invention.

FIG. 21 illustrates still two further embodiments of the invention. The first therof is shown in the upper portion and the other thereof is shown in the bottom portion of the Figure.

Working body 48 has a cylinder, wherein the working piston or first piston 60 is reciprocating and expanding and contracting periodically the working chamber 61 therein. Inlet valve 50 and exit valve 49 are provided similarily as in others of the Figures. The upper or working body 48 is provided according to this embodiment with a radially inwardly open annular ring groove 83 which forms a spring containing chamber 83 wherein a portion of the spring 84 is located. The deeper the ring chamber 83 is, the longer may become the life time of spring 84. Ring chamber 83 is radially respectively to the longitudinal axis of the first piston 60 distanced from the cylinder 61 in order to make a spring with great length of the spring possible. That helps to increase the life time of the spring. The spring 84 serves to drive the first piston 60 downwards in an outward stroke. For this purpose, according to this now discussed embodiment of the invention, the working or first piston 60 has a spring seat 85 to center on piston 60 one end of the spring 84 and a spring bed 86 to bear thereon the spring 84. Thus, the spring 84 presses against the bed 86 of piston 60 and thereby presses the piston 60 outwards in the expansion stroke of the working chamber 61. The bottom end of piston 60 is a plane flat face.

The other embodiment of the invention in the bottom portion of this Figure shows a second piston 59 below the first piston 86. The second piston has one first end with a flat end face, which is borne by the flat end face of the first piston and radially respective to the axes of the pistons displaceable thereon. Thereby the action of FIG. 20 is reversed. While the drive piston 59 of FIG. 20 drove the working piston 58 in an inwards stroke, the working piston 60 of FIG. 21 drives the drive piston 59 in an outwards stroke. Drive fluid in the space between the upper body 48 and the bottom body 148 is thereby spared. Piston stroke guide 55 with outer face or guide face 56 acts as in FIG. 20. The piston shoe 52 is interposed between drive piston 59 and stroke guide face 56 of stroke actuator body 55 with the first piston shoe end face 57 sliding along the stroke guide face 56 as in FIG. 20.

The bottom end of second or drive-piston 59 is formed by a second end face of a radius 77 around a center 78. Thereby the second face 76 or second end 76 is either a form of a portion of a ball or of a cylinder, depending thereon, whether the center 78 is a point or a center line. The second end face of the piston shoe 52 has a configuration complementary to that of the end face 76 of the piston 59, it has referential 75 and is substantially of a radius 77 of size 77 around center 78 as that of the piston end face 76. The second end face of the piston shoe 52 has thereby the form of a portion of a hollow ball or of a hollow cylinder, depending again thereon, whether the center 78 is a center point or a center line. When it is a center line 78, then this center line must be normal to the longitudinal axis of the drive piston 59. Drive piston 59 drives the working piston 60 at the inwards stroke and the inwards stroke is guided and actuated by stroke guide 55,56 as in FIG. 20.

A large radius 77, large compared to the radius of the longitudinal diameter of the piston, results in a respectively high capability to carry a great load and thereby to operate the device with very high pressure in chamber 61. In the Figure the pistons reciprocate radially whereby the first and second ends or endfaces are the radial endfaces. The axes of the cylinder and pistons are radial in the Figure. But relatively to the axes of the pistons, the axes are longitidinal and axial axes, while the end faces are extending radially when seen relatively to the axes of the pistons or piston shoe. Piston shoe 52 may again have fluid pressure balancing pockets 73 in its radial end faces 75,57. However the pressure fluid to be lead into them is supplied in this Figure preferredly as in FIG. 14, but only rarely as in FIG. 20.

Bottom body 148 has bottom outcuts 80 to guide the respective fingers or arms 81 of the piston shoe 52 therein. In a rather primitive way such arrangement was already proposed in my U.S. Pat. No. 3,874,271. According to the present embodiment of the bottom portion of FIG. 21, which is also provided, if so desired, in FIG. 20, the outcuts 80 are extending deeply into the bottom body 148 and deeper than the center 78 is located, whereby they are extending beyond the center 78 into the bottom body 148. The piston shoe arms 81 are extending also deeply into the outcuts 80 and beyond the center 78. The ends of arms 81 are forming the guide ends 79 which are guided along the walls 82 of the outcuts. The feature of this arrangement is, that the end guides 79 are substantially in the radial height of the center or pivot center 78 of the Figure. This enables a perfect keeping and guiding of the piston shoe in outcut 80 and prevents escape of the end guides 79 out of the outcut 80 and away from the guide faces 82.

In FIG. 24 the embodiment of the invention, illustrated therein, shows a longitudinal sectional view through a portion of a hollow-shaft motor of the invention. Rotor 11 has a concentric rotor bore or rotor hub. But instead of providing a control body therein, the embodiment extends the rotor 11 with respective axial extensions through the bearings 7 and seals out of the housing 8 of the device on the ends thereof. The rotor and its axial extensions then obtains a centric bore 1. Through this centric bore one a shaft to be driven by the rotor 11 or for driving the rotor 11 may be extended. Respective spline means or key means may be added to bore 1. The motor is then conviniently mountable onto a machine tool, vehicle or the like. In the detailed embodiment of FIG. 24, however, there is a shaft 2 mounted into the rotor hub of rotor 11. Shaft 2 is now the hollow shaft of the motor. It may be provided with inner and outer seat cones 3 and 4 on one end of the shaft. There may further be a flange 5 on the same end and an undercut ring groove 6 therebehind. This is convinient to use this hollow shaft as an operation spindle for a machine tool, like lathe, grinder, milling machine or drill. Respective strong radial bearings 7 are provided on both end portions 8 of the housing, whereby the housing 8 becomes in common a motor housing and a spindle bearing housing. The bearings 7 are accordingly stronger and more precise than they would otherwise be used in a fluid motor. The other end of shaft 2 may be provided with cylindrical and/or plane seats 9 and/or 10.

These seats may be used to mount an axially operating drive means, like for example a cylinder, piston and/or counter acting springs to drive the shaft 2 as a machine tool spindle axially forward and backward within housing 8 and within rotor 11. Respective key means may be added between rotor 11 and shaft 2. In practical applications I am providing this arrangement for the automatic production of piston shoes, bearings, retainers and the like. The shaft 2 is thereby becoming a motor shaft and at same time the spindle of a machine tool. It may at same time revolve, carry a working means, like bite, cutter, grinding wheel, revolve it and also move it axially in the respective operation. When the axial drive set has a counter acting spring in combination with a fluid driven piston in a cylinder, the end pressure may define the axial movement of shaft 2 and thereby the depth of the cutting operation. Automatic pressure control may thereby define an automatic deepness of the cutting operation. Housing 8 also has the entrance and/or exit passages 18,19 for the respective fluid, the control port pairs 16,17, the rotor passages 15 and the chambers or cylinders 12 and/or 13 with the displacement means or pistons 14 reciprocating therein or co-operating therewith for the periodic increase and decrease of chambers 12,13.

FIGS. 25 and 26 are demonstrating and illustrate my "drive-and carry-motor". Here the motor may have in housing 20 a shaft, which extends at one end of the housing 20 or which extends with two ends 21 and 22 instead of only one end 21 out of the respective axial end of housing 20. Instead of having an outwardly extending shaft end, the shaft may also be a hollow shaft as in FIG. 24.

Provided in this embodiment of the invention is a radial and/or axial bearing in the housing which carries more than the load of the respective rotor therein. But which is, in addition, able to carry an outer load. A further feature and embodiment of this arrangement is, that the entrance and exit fluid ports 18,19 are at least two, but commonly three or four in this motor and that they are extended all in one direction to end in plane and equal faces or in parallel faces 88. Further the said ports 18,19,28,19 are distanced from each other by the respective distances 31 and/or 32. Respective threads 30 are provided around the entrance and exit passages 18,19,28,29 into the respective port portions of the motor. This is shown as sample in the cross-sectional Figure below FIGS. 25 and 26 which is a sectional view along the arrows in FIG. 25.

The arrangement of the strong, multi-loads carrying rotor bearings, as 7 in FIG. 24 into FIGS. 25 or 26 in combination with the arrangement of leading the ports into a single direction, for example upwards and let them end in plane faces of equal location in the same plane or parallel in respective planes, makes it possible to use these motors as "drive and carry" motors. They are thereby obtaining the double function of driving the rotational movement of a driven elements and at the same time to carry said element or to be carried by said element.

The plane faces 88 make the easy assembly of the motor onto an even plane face of the respective machine or vehicle possible and they make it also possible and convinient to carry the respective motor 20 on a respective fluid line structure. The distances 31 and 32 add to the stability of the fastening of the motor 20 and thereby add to the capability to carry in addition to drive a rotary movement of an element.

Later Figures in the specification will give a few but only a few samples of applications of the "drive and carry" motors of this embodiment of the invention.

In FIGS. 27 and 29 the drive and carry motor 20 is kept on the fluid pipe structure of the four pipes 33 to 36. The shaft of the drive and carry motor 20 holds and drives a propeller 37. Thereby the motor is used again as a driving motor, meaning as a common fluid drive motor but at the same time as a carry-motor by carrying and holding on its shaft the propeller 37. The propeller may provide a traction or thrust and carry thereby the motor 20. Motor 20 will then carry the pipe structure of pipes 33 to 36, while pipe structure 33 to 36 may then drive or carry a respective vehicle or portion thereof. For example, an aircraft, a helicopter, a boat or a ground borne vehicle.

In FIGS. 29 to 31 the drive and carry motor of FIGS. 25-26 is utilized to drive the wheels of a car or truck and thereby also to carry the body of the car or truck. The pipe structure, which carries the fluid lines to and from the motor(s) 20 is shown by 43 to 45 and the structure may also be a body instead of pipes. However it should include or contain the fluid lines to and from motor(s) 20. In FIGS. 29 and 31 there is a pivot arrangement centered in the pivot axes and bars 42. These also contain fluid lines or portions thereof to and from the motors to communicate to those in the structure 43 to 45. An operation arrangement or a plurality thereof, shown by 39,40 and connecter 41 is provided in these Figures to pivot the wheels 50, 51, which may have tires 49 and the fluid motor(s) 20 into the upwards pivoted end position of FIGS. 29 and 30 and reverse it to the downward pivoted end position of FIG. 31. In FIGS. 29 and 30 the body 38 of the truck is now let down completely to the road or ground 52. Any load can now be moved easily onto the load space 49 above the body 38 over the inclined end face 46 of the body of the truck. In FIG. 31 the body 38,46 is now moved upwards for travel of the truck with the respective speed on the ground, the road or the highway. The motors 20 of these Figures are now fulfilling a number of functions, namely to drive the wheels 50,51 and thereby to drive the car or truck but at the same time also to carry themselves and to carry by them the truck and the load on space 49 of the truck. The pivot arrangement to swing the motors 20 and the wheels 50,51 from the upwards end position into the downward end position is a further embodiment of the invention. In the upward and downward end positions the pivot arrangement may have arresters, to maintain the pivot arrangements 39,40,41, 42,43,44,45 in the respective arrested down or up-position.

In the embodiment of FIGS. 32 and 33 another application of the drive and carry motor is demonstrated. At the same time this embodiment provides a swing axis arrangement for a ground borne vehicle, like a truck or car to reduce the shocks of the body of the vehicle when the vehicle moves over not perfectly even roads or even over rough terrain.

The body 55 of the vehicle is provided with swing holders, which center in the swing pins 59 and 60. Thereon the structures of fluid pipe structures 56 to 58 are borne and they can swing or pivot around the axes of pivot pins 59 and 60. Respective ribs 64 are commonly provided between the pipes or body portions of the structures. At least two fluid lines are provided in the structure to carry fluid to and from the respective motor 20. A third and/or fourth fluid line may also lead fluid to and from the respective motor 20 or it may be a respective blind line with no fluid flowing therethrough. That applies also to the third and fourth fluid lines or pipes of other Figures, for example to FIGS. 27 and 28.

The cross-sectional FIG. 33 which is taken along the line with the arrows of FIG. 32, shows, that there are three fluid lines or pipes 56 to 58 which are respectively distanced from each other in accordance with the similar distances 31 and 32 of FIGS. 25 and 26. The ports of motor 20 are ending here endwards, but again in a single direction and end again here in plane faces 88. The three-pipes arrangement of the structure with the strengtheners 64 and corner strengtheners 68 therebetween give these structures a good capability to carry the car or vehicle and its body and its load 55. However in combination with the strong and multi-purpose bearings of the drive and carry motors of FIGS. 25 to 26. On holders provided on the structures are the shock-absorber pins 63 provided. They are connecting the shock absorber arrangement of absorber body 61 and absorber pistons 62 to the structures 56 to 57 on both sides of the vehicle. When the car or truck runs over uneven ground and a shock is respectively appearing onto the wheels 53,54, the shock limitation apparatus 61–62 gives way, which means, that it elongates. The wheels 53,54 are swinging or pivoting then upwards on the structures 56 to 58. When the shock reduces, the shock reducers 61,62 contracts and forces the wheels 53,54 with the motors 20 on the structures 56 to 58 downwards again in a reversed direction of the pivoting or swinging.

More details of the invention will become apparent from the following claims, which are considered to be a portion of the disclosure of this present patent application, even if they use different terms, expression or definitions.

Figure 35:
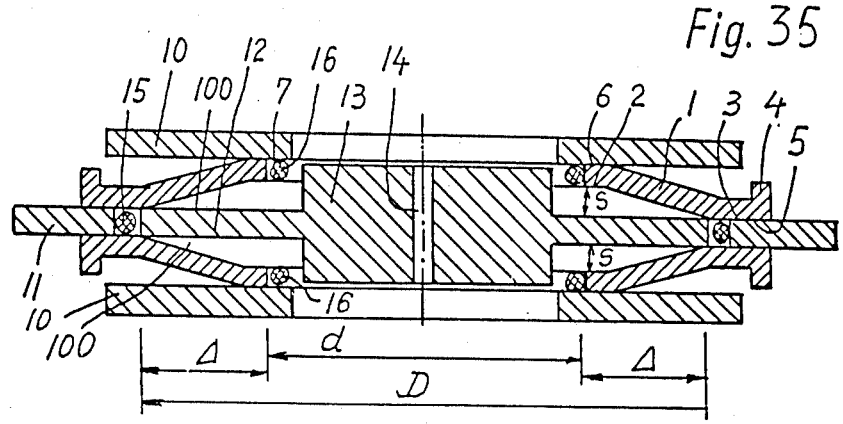
FIG. 35 is a longitudinal sectional view through an assembly of the invention.

Referring now to FIG. 35, the tapered element 1 has a tapered portion 1 like a disc spring. It is flexible and has a spring action capability in axial direction parallel to the axis of bore 14. The disclike element is hollow with a radial inner end 7. In FIG. 35 a plurality of such elements 1 are laid together in at least one pair of elements or discs. Each element of a pair is turned 180 degrees whereby the elements 1 are facing other symmetrically relatively to a medical radial imaginary plane perpendicular to axis or bore 14.

Seals 15,16 are set to seal a pumping or motoring chamber or space between the two elements of a pair of elements or a disc-pair. Inlet means and outlet means are attached to the working chamber, pumping or motoring chamber or space as known from my parental patent application Ser. Nos. 665,482 and 282,990. The inlet means and outlet means are commonly inlet valves and outlet valves or closeable inlet and outlet ports.

According to my elder application Ser No. 282,990, such disc pairs are working satisfactory in the subcritical range. The subcritical range is that range, where the strength of the disc exceeds the force which tends under pressure in the springchamber to depart the discs away from each other. For high pressure in the chamber it was required to clamp two discs together in order to prevent the departure of disc portions and seals from each other under the high pressure in the supercritical range, where the forces of pressure in the chamber between the discs would exceed the holding spring strength of the disc portions 1.

The invention now overcomes the requirement of clamping of disc pairs, which is expensive, by the extension of the critical pressure point between the subcritical range and the super critical range to a higher critical pressure point. Thereby the expensive clamping can be spared until the extended higher pressure point in the chamber is reached.

To obtain the extension of the pressure range between the subcritical and the supercritical ranges to a higher pressure, the discs are in accordance with this present invention provided with strengthening portions.

In FIG. 35 the strengthening portions are portions 3 and they extend radially outwardly from the tapered portions or spring-action portions 1. Additional strengtheners 4 are added in FIG. 1 to the strengthening portions 3. They are extending axially from the outer portions of strengthening portions 3.

Figure 36:
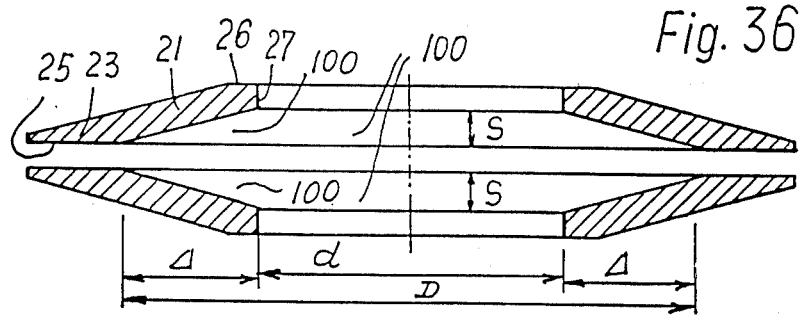
FIG. 36 is a longitudinal sectional view through elements of the invention.

In FIG. 36 the strengthening of the disc is obtained from a conventional disc spring by grinding or machining the outer axial end portion of to a radially plane face 25, which at the same time is one of the seat faces. FIG. 36 thereby provides a very simple and inexpensive disc for a higher critical pressure point. Because common disc springs which are inexpensively available on the market can be used. It should be noted however, that the available stroke of the disc spring will decrease.

Figure 37:
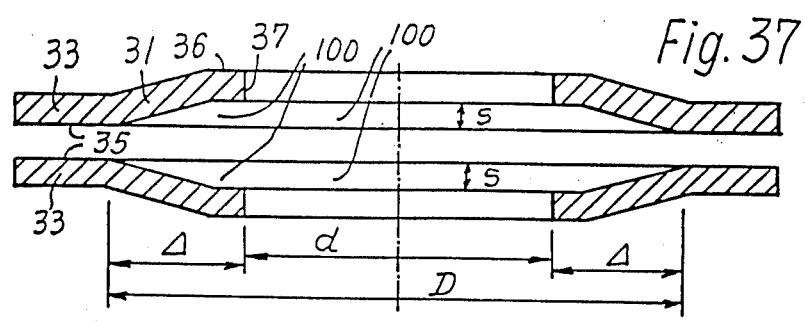
FIG. 37 is a longitudinal sectional view through elements of the invention.

In FIG. 37 another simple strengthened disc with spring action for the increase of the critical pressure point to a higher pressure is shown. Here the outer ends are formed as flat discs 33, which constitute the strengthening portions in this Figure. The radial inner portions are extending radially inwards from the tapered portion 31 and form there the one seat face 36, while the outer portions 33 form the other seat face 35.

The strokes of the flexible pumpable discs with inclined stroke portions 1,21,31 in FIGS. 35 to 37 are able to make a stroke "S" as shown in the Figures. For a long lifetime of the discs of the invention the appearing strengths in the portions of the elements should be considered. Short strokes "S" will increase the lifetime, because the strengths in the materials will than vary between closer values than they would at longer strokes "S". Material and details of the forms have a great influence on the lifetime and on the permissible maximum of strokes in units of time.

When the elements of the invention of FIGS. 35 to 37 are used as pump(s), a top holding plate 10 and a bottom holding or support plate 10 are assembled. These top and bottom plates form end plates, when the axes of the elements are laid horizontally. The pump head of FIG. 38 may be assembled to one end of the pump element set and a stroke drive means may be set to the other end of the element pair. The parental applications show details of samples of pump heads and of drive means for driving the strokes "S" of the elements.

Figure 38:
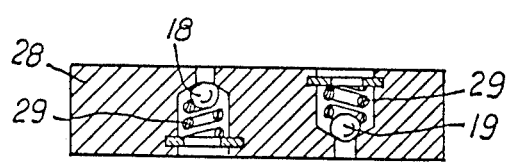
FIG. 38 is a longitudinal sectional view through a pumphead of the invention.

In FIG. 38 a simple sample of a pump head is provided. It may be laid as pump head 28 onto one end face (seat face) 26 or 36 or 6 of the set of FIGS. 35,36 or 37. Head plate 28 contains the inlet valve 18 and the outlet valve 19. The valves may be supported by springs 29. Instead of valves other inlet and outlet means may be provided, if so desired.

FIG. 35 also demonstrates, that it is desireable and of benefit to lay the ring plate 11 between to opposed elements in order to be able to obtain a seal seat for the plasticly deformable seal 15, which in this case is the medial seal or inner seal 15. The end plates 10 are commonly getting smaller inner diameters than the elements 1,21,31, in order to form a seal seat for the end seals 16. These end seals 16 are also of plasticly deformable material, for example, O-rings. The medial outer ring plate 11 must be of a relatively big outer diameter in order to maintain enough radial strength against radial deformation. Otherwise the ring plates 11 and 10 may be plates, which are simply grinded on surface grinders in order to have radially plane and parallel axial end faces.

Thus, the ring plate 11, which is also called "the outer ring", should extend radially outwardly beyond the outer diameters of the elements or coned rings 1. It should also be attempted to make the radial dimension suitable to obtain equal radial deflection of the ring plate 11 under fluid pressure from the inside as the radial deflection of the outer ends of the coned rings 1 at their seats 5 is under the axial compression of the coned rings in order to prevent or reduce friction at radial relative movement between the rings 11 and 1.

For pumps it is important to prevent dead spaces or dead volumes inside of the pump means. Because a big volume in the pumping chamber 100 inside of the spring pair or inside of the pair of elements of the invention would fill the volume with fluid. Fluid is however compressible at least slightly and would compress considerably under the high pressure for which the pump of the invention is desired.

Therefore dead space fillers 13 are assembled inside of the pumping or working chamber 100. Because without them, the pump would have a reduced volumetric efficiency because of the compressibility of fluid. The dead space filler 13 reduces the amount of fluid in the pumping chamber and thereby the amount of compressibility in the chamber. Because the dead space filler 13 is made of uncompressible material, for example, of steel, Iron, Carbon fiber or the like. A passage 14 must be provided in order to permit the fluid in the bottom portion of the pump chamber to flow into the top portion of the pumping chamber and vice versa.

Filler 13 commonly gets a medial radial extension ring 12 which also acts as dead space filler. At same time it can be a seal holder to keep the medial seal 15 in its place.

End plates 10 and medial radial extension plate 12 also serve as supports for the tapered spring action portions 1,21,31 of the elements of the invention. Because if there would not be axially strong supports, the tapered springable portions 1,21,31 of the elements might axially bow or bend out or break under the very high inner pressure in the chamber between the portions 1,21,31. The pump of the invention is able to work with pressures of many hundred atmospheres, for example also with thousand atmospheres, if the assemblies of FIGS. 35 to 37 are used. At such high pressure even strong spring steel might bow or bend.

The calculation of the delivery of the pump per stroke "S" of an element of the invention is done, as follows:

An infinitesimally small radial portion of the tapered portion of the element may be: "dR", while the respective axial portion of the said portion of the element may be : "dY". This gives the tapered area: "dA".

Thereby FIG. 39 is obtained and it brings the development of the calculation of the pumping action as shown in FIG. 10.

The pumping delivery volume of the tapered portion 1 of an element of the invention then becomes:

$$V_T = (\pi/6) tgk [R^3 - r_1^3] \quad (1).$$

The radial extension of the tapered portions 1,21,31 is shown in FIGS. 35 to 37 by the greek letter "delta" and is the half of the difference between the inner diameters "d" and the outer diameters "D" of the tapered portions 1,21,31 of the elements of the invention.

The delivery volume radially inside of the inner diameter "d" per a stroke "S" of the element is $$Vd = r_1^2 \pi S \quad (2)$$

wherefrom follows, that the sum of the delivery volume per partial stroke "f" of the stroke "S" is:

$$V_f = (\pi/6) tgk_f [R^3 - r_1^3] + r_1^2 \pi tgk_f (ro - ri) \quad (3)$$

and, wherefrom also follows, that the delivery volume of a pair of elements, as shown in FIGS. 35 to 37, is 2 times of the calculated volume "$V_f$" of equation (3).

In the above equations the following measures may by way of example be used: V = volume in cubicmillimeter and radii R and r in millimeter. Pi is about 3.14 and kappa is the angle kappa of FIG. 39 to be used in degrees.

For more details of the technology of the elements of the invention, Rotary Engine Kenkyusho Report RER-8109 may be studied. It is available from Rotary Engine Kenkyusho, 2420 Isshiki, Hayama-machi, Kanagawa-Ken, Japan, against payment of the costs and against information for what the study of the report is desired.

In FIG. 40 the referential 1 defines the coned portion of the innerbend spring of this Figure. The mentioned coned portion is common to most disc springs of the former art. Commonly, the disc springs of the former art consisted only of the mentioned coned portion with a centric bore therein.

On the radial outer end of the coned portion 1 the outer seat 59 is formed and commonly roughly a cylindrical outer face. On the radial inner end of coned portion 1 the inner portion 21 is formed in the form of about a cylinder, extending axially from the inner part of the coned portion in the direction of the inward inclination of the coned portion 1. The inner face 28 of the inner portion defines the bore 22 therein. Since the inner portion 21 is bent from the coned portion 1, and bend on the radial inner end of the coned portion 1, this spring is called herein the "innerbend spring". The radial outer portion of the coned portion 1 is shown by 27 and it ends in the outer seat 59.

In FIG. 41 the coned portion 2 ends radially inwardly by the inner seat 29 which is again roughly a cylindrical face, in this case, a cylindrical inner face. It borders the medial bore 25. On the radial outer end of the coned portion 2 the spring is bent in axial direction in the direction of inclination towards the outer end of the spring and the bended portion defines the outer portion. Since the bent portion of this spring is located on the radial outer portion of the coned portion, this spring is called: the "outerbend spring". The outer portion 23 forms again roughly a cylinder with a hollow space 24 therein. Portion 2 lies above the radial distance $\Delta R$ with angle of inclination = 8.

The outer bend spring of FIG. 41 and the innerbend spring of FIG. 1 are forming together a disc spring pair, FIG. 44 demonstrates, how the springs of FIGS. 40 and 41 are mounted to a disc spring set. The upper spring 2 is an outerbend spring and its outer portion embraces the outer seat of the innerbend spring 1. A slight space or clearance 26 must be provided between the outer portion and the outer seat in order to permit slight expansion of the innerbend spring in the outerbend spring during compression of the innerbend spring 1. On the outerbend spring 2 of the next spring pair, which is assembled below the upper spring pair. the inner portion of the innerbend spring of the top spring pair is inserted into the inner seat of the outerbend spring of the bottom spring pair. Thereby the two pairs of springs are centered relative to each other while each spring of the equal spring pair is centered automatically to the other spring of the same spring apir. The pairs added are assembled similarily.

The assembly of FIG. 44 thereby demonstrates, that the spring pairs of the invention are self-centering and do not require the setting of a medial guide bar in the bores of the springs as was commonly required in the disc springs of the former art.

The commonly used disc springs of the former art are shown in an assembly of the style of the former art in FIG. 47. The former art disc springs 52 and 53 of FIG. 47 consisted of simple coned portions with a bore therein. They were axially of each other assembled with opposite inclinations of the cones of neighboring springs 52,53. A guide pin 51 was extended through the medial bores of the disc springs to center the springs 52 and 53 relative to each other and to guide them along the guide bar 51. Since the springs compress also slightly radially inwardly, when they are compressed axially, a clearance 54 was provided and required between the springs 52 and 53 and the guide bar 51 of the former art. That sometimes prevented a clear allaround line contact between the neighboring springs 52 and 53 of the former art and sometimes resulted in a point or two point contact between two neighboring springs of the former art. That prevented effective work of the former art disc springs and the thrusts of them then departed from the pre-determined spring thrusts.

It is one aim of this invention to overcome the difficulties of the former art and also to spare the medial guide bar of the disc springs of the former art.

In FIG. 42 the innerbend spring of the other embodiment of the invention has the medial coned portion 3. Radially inwards thereof extends the substantially radial first radial plane portion 38 with the seal seat 40 thereon. Seal seat 40 ends radially inwardly on the downwardly extended inner portion 42 with guide seat 41 as the outer face and medial bore or passage 39 therein. The inner portion 42 is otherwise as described for FIG. 40. On the radial outer end of the coned portion 3 is the sealseat portion 33 provided. It forms substantially a hollow ring portion with a cross-sectional area which is "u-shaped". The interior of the "U-shape" forms the sealseat groove 31, which is bordered by portions or walls 32,33 and 34 of sealseat portion 33. Wall 33 may be radially substantially plane, while walls 32 and 34 form outer and inner walls of cylindrical shape of the "u-shaped" seal seat portion surrounding the circular sealseat groove 31. The mentioned sealseat groove 31 is open in the axial direction oppositely directed relatively to the axial direction of the extension of the inner portion 42. Radial inner spaces 35 and 37 are formed endwards of the coned portion 3.

In FIG. 43 the coned portion 4 extends from its radially innermost end into the second radial plane portion with seal face 45 on the upper axial end thereof. Radially inwards of the second radial plane portion with seal face 45 the extension 43 forms a cylindrical portion extending axially upwards in the Figure and forming therein the radial inner guide face 44 which has a diameter substantially equal to the outer diameter of the cylindrical face 41 of the inner portion 42 of the innerbend spring of FIG. 42. The spring of FIG. 43 is an outerbend spring, namely the outer bend spring of the embodiment of FIGS. 42 and 43. Inner face 44 is a substantial cylindrical face and able to fit around extension 42 of FIG. 42. The dimensioning must be respectively properly. On the radial outer end of the coned portion 4 the spring extends into the third radial plane portion 47 and on the radial outer end of the mentioned third radial plane portion 47 is the bended outer portion 48 provided. Radially inside of it is the space 50 provided which extends to the cornered inner space 50. The third radial plane portion 47 forms a seal cover by one of its axial end faces. The extension 43 extends in the axial direction of the radial inward inclination of the coned portion 4, while the bended portion, which is the outer portion 48 extends in the opposite axial direction. Otherwise the outer portion is provided similar or formed similar to that of FIG. 41.

In FIG. 45 a preferred application of the springs of FIGS. 42 and 43 is demonstrated. They are here utilized to act as main members of a pump. The housing 7 forms a hollow body with an opening downwards in the Figure. The top of the Figure contains the top-cover which in the Figure closes the interior space 80 in one axial direction. Cover 7 is provided with an inlet means which might consists of a passage periodically opened and closed by valve 11. Seat portion 60 is the valve seat, 11 the valve shaft; 61 the valve spring and 62 the holding cover for the spring 62 of the valve. The opening and closing of the valve 11 arrangement can act as in common pumps as inlet means. In housing, body or cover 7 is also the outlet means 12 provided, which is shown in the Figure as an outlet valve 12 closed by spring means 63. From the outlet means 12 extends the outlet passage 13 for the delivery of fluid which is pumped in the interior space between the respective spring sets. At least one spring pair of the embodiment of FIGS. 42 and 43 of the invention is mounted into the hollow space in the hollow body 80. It is however preferred to assemble a plurality of spring pairs of FIGS. 42 and 43 therein, for example, as actually is shown in FIG. 6. When the springs of the pairs are properly assembled relatively to each other as shown in FIG. 6, an interior spring space 14 is formed between the springs. It is called the "interior chamber " 14.

At least partially deformable seal rings, for example lead rings, copper rings or plastic seal rings 75 are inserted into the circular seal seat grooves 31. Similar seal rings of suitably fitting sizes are inserted into the seal seats 40. The respective extension 43 of the neighboring spring of FIG. 43 embraces the respective inner portion 42 of the respective spring of FIG. 42. The respectively inserted seal ring 75 is then located between seal seat 40, seal face 45 and extension 43 of the respective two neighboring springs of FIGS. 3 and 4 which are engaging each other by the cylindrical faces 41 and 44 while the upper end of extension 43 engages a portion of the seal seat 40. As is also shown in FIG. 45, the dead space filling body 64 may be assembled radially outwardly around the mentioned seal ring 75 in seat 40. The outer diameter of dead space filling body should preferredly conform to the inner diameter of the seal seat portion 33,34 to fill the space 35 when the springs are compressed.

In the assembly of FIG. 45 the upper seal seat groove 31 is closed by the plane bottom face of the top cover of body 7. Otherwise the seal seat grooves 31 are closed by the respective third radial plane portions 47, namely by the respective radial plane endfaces thereof. The seal seat portions 31 to 34 of the springs of FIG. 42 are inserted and kept and guided in the spaces 49 of the springs of FIG. 43 radially inwards of the respective outer portions 48. Since the inclinations of the coned portion 3 and 4 of the respective springs are mounted in opposite directions at neighboring springs, the interior chambers 14 are forming coned spaces 14 when the springs are decompressed. The plurality of interior spaces 14 are communicated by the respective passages 65, which are also parts of or are the bores in the respective springs. To prevent dead space or to reduce the dead spaces in the pumping arrangement of FIG. 6 to a minimum, the passages 65 should be of the smallest possible diameter permitting about equal efficiency of dead space and flowthrough occurances. The single interior spaces 14 are sealed by the seal rings 75. Instead of setting the springs of FIGS. 42 and 43 into the pumping arrangement of FIG. 6 the springs of FIGS. 40 and 41 might become inserted thereinto without seals 75, if the proper sealing of the spaces 14 is provided without seals 75 or by the springs of FIGS. 40 and 41.

It is preferred to prevent the passage 65 in the bottommost spring and instead to provide on the bottom end, compared to the top end, the spring with a closing portion 66 for the closing of the interior spaces 14 in one axial direction. Otherwise the closing would have to be done by the thrust body 8. The thrust body 8 is assembled on one end of the spring pair set, in the Figure on the bottom end of it. Thrust body 8 may have a centration on the closing portion 66 or on the endmost respective spring of the spring set.

In FIG. 45 the thrust body 8 and the thereto bottomwards attached slide shoe 9 are engaging each other in slideable faces 83 and 84 which are formed with equal radii around a common center to permit a pivotal movement of the slide shoe 9 relatively to the thrust body 8. The top end face of thrust body 8 bears on the bottom of the respective portion of the respective spring of the spring pair of the invention. The end remote from the thrust body forms on slide shoe 9 a hollow part-cylindrical slide face 87 which slides along the outer face 88 of the therebelow assembled eccentric cam 10. Eccentric cam 10 with centre 86 revolves with shaft 11 with center line 85. A respective distance between center lines 85 and 86 forms the eccentricity between outer face 88 and center line 85, whereby during the revolution of cam 10 the portion of face 88 engaging face 87 moves upwards and downwards whereby the springs in the hollow body 7 are periodically compressed, while they are decompressing under their own spring force. Each one compression and one decompression during each revolution of cam 10 and shaft 11. The eccentricity between center lines 85 and 86 is suitably dimensioned to fit with the compression and decompression motion of the springs in space 80. At the mentioned decompression fluid is passed through inlet 11 into the interior space(s) 14 and out thereof through outlet 12 under pressure, which might be a high pressure until a couple of tenthousand psi, during the respective compression stroke.

One of the features of the arrangement now described, is, that there are no relatively moving parts in the pumping arrangement. The motion of attached face portions of the springs is only minor and only fractions of millimeters. The consequence thereof is, that the arrangement is capable of pumping non-lubricating fluids in the interior spaces 14. In the drawing this non-lubricating fluid is shown with the words "water" but it might be any other non-lubricating or lubricating fluid.

On the other hand, there are relatively to each other moving faces 83,84,87 and 88 on the thrust body, slide shoe and the cam, 8, 9,10. When these faces would not be lubricated, they might weld. It is therefore recommended to lead a lubricating fluid, which is written "OIL" into the interior space 8o in body 7 and into the space which surrounds the cam 10, slide shoe 9 and thrust body 8.

Key means 74 may prevent rotation of cam 10 on shaft 11 and slide shoe 9 may be provided with guide portions 67 for proper keeping or guiding in space 80 or along interior face 81 of body 7.

In FIG. 45 the guide portion 67 of slide shoe 9 is only losely fitted with a large clearance in the inner face 81 if body 7. That is quite proper, when only the interior chambers 14 which are formed between the springs, are used for the pumping of a fluid. It should be understood however, that the guide 67 may get a rather close fit along the inner face 81 of body 7, or that seal means may be provided between shoe 9 and the inner face 81 of the hollow body 7. In such case a respective inlet means and an outlet means would have to be provided to the space 80 which then inside of body 7 would form a second pumping space. The second pumping space would act parallel to the pumping space formed by the interior chambers 14 within the springs of the spring pairs of the invention. When the mentioned second pumping space 80 shall pump a high pressure in the respective fluid the assembly of the before described dead space filling bodies 64 is important for a good efficiency of the pump of the second pumping space 80. Because without the filler bodies 64 there would remain dead spaces, formed by spaces 35 of the springs of FIG. 3 and these dead spaces 35 would be dead volume in the second pumping chamber 80 which would reduce the efficiency of the second pumping chamber by internal compression losses in the to be pumped fluid.

Fluid pressure balancing pockets, which might be circular grooves 69,71 may be provided to both end faces of the shoe 9 and may be communicated together by a respective bore and be communicated to the medial passage 72. Pressure limitation recesses 68,70 may be provided to limit the fluid pressure loaded areas of faces 83,84,87,88 to proper dimensions and the recesses 68,70 may be communicated to respective low pressure spaces.

Since, when the springs are very strong and the pressure in the fluid pumped in the interior chambers 14 and/or in chamber 80, is very high, the forces which are pressing faces 83 and 84 as well as faces 87 and 88 together, are extremely high, it is preferred to lead at the periodic time intervalls of the compression movements, fluid, especially lubricating fluid, under a respectively high pressure into the balancing recesses 68,71 and 72. This can become established and timely suitably become controlled by the provision of a control fluid passage 73 through a member, for example through shoe 9. Shoe 9 may get axial plane end faces fitting slidingly along plane control faces of the housing of the device - not shown in the Figure - whereby a fluid supply through control ports in the said faces of the housing into passages 73 and 72 could be timely properly controlled in relation to the compression strokes. Low pressure would then act in passages and recesses 72,73,68,71 at decompression movements while high pressure would act therein at times of compression-pumping delivery movements of the device and arrangement.

When the arrangement of FIG. 45 is assembled into or attached to a device, machine or vehicle which has a fluid pump or a fluid motor, the pressure line in the respective pump or motor might become communicated to the fluid supply through the mentioned housing into passages 72,73. An addition of a fluid pressure supply device to passage 73 can then be spared and the communication, here described, will not too much reduce the power or efficiency of the respective pump or fluid motor.

FIG. 46 demonstrates a spring pair of an other embodiment of the invention. In this Figure the embodiment is especially suitable for very high thrust capability and strength of the springs of the pair. The coned portion 5 of the outerbend spring has for this purpose a radially very drastically widened third radial plane portion 58, which is widened radially so wide, that the outer portion 57 embraces the drastically radially extended fourth radial plane portion 55 of the innerbend spring with coned portion 6. The said fourth portion 55 extends radially from the sealseat portion 32-34 radially outwardly, provides thereby the added strength to the spring and may be provided with a bend portion 56 to be fitted therewith into the outer portion 57 of the outerbend spring with coned portion 5.

FIG. 48 demonstrates in a longitudinal sectional view a simple pump - or motor - arrangement including a coned ring. The body 95 has an outlet means 12, while body 96 has an inlet means 11. Body 96 may be reciprocated up and down along the arrows 97. Body 95 carries the first coned ring 2' with its interior space 14. Body 96 carries the second coned ring 1' with its interior space 114. The first and second coned rings 1' and 2' are axially oppositionally directed, so, that their interior spaces 14 and 114 would face each other, if the first and second coned rings or springs 1' and 2' would be laid directly onto each other. The specifity of FIG. 48, however, is, that the both springs or coned rings 1' and 2' are not laid directly onto each other, but a radially plane ring 90 of rigid, -nonplastic- material is inserted between the radial outer ends of the springs 1 and 2. This is a very important arrangement of the present invention. This ring 90 is also called an outer ring, because it is a hollow ring with an inner space radially inside of the ring 90. There it forms the seat space 92 for the reception of a plasticly deformable ring, for example, a seal ring, or O-ring. It is very important, that the outer ring ring 90 is a plane ring of equal thickness and of a thickness to which a fitting seal ring is available. Outer ring 90 must also be of radial rigidity, which means, that it must be radially strong enough not to break under pressure in the interior space radially inside of the ring 90. Thereby it extends radially outwardly beyond the radial extensions of the coned rings 1' and 2'. FIG. 48 thereby demonstrates in a longitudinal sectional view an arrangement which includes a coned ring 1' or 1' and 2' or more coned rings, comprising as the arrangement in combination, a coned ring, for example 2', a first body for example, 95, a coned ring, for example 1', and a second body, for example 96,90 or 2', with said coned ring 1' inserted between said first and second bodies 95, 90,2',96, said coned ring comprising a coned portion 1' between a radial inner and outer portion 28,27 with an interior space 14 formed radially inwards of said coned portion 1' or 2', wherein said radial outer portion 27 of said coned ring 1, 1' or 2' forms a seat face portion 127, wherein one of said bodies forms a complementary face portion 227, and, wherein said complementary face portion is laid against said seat face portion, namely 227 against 127, whereby said coned ring 2' is borne on said body, for example, 90, or 96, 95 and 90; 90 and 96 or 95 and 96.

Respective seat face portions and complementary face portions are preferably also formed on coned ring 1' and/or on bodies 95 and/or 96.

The significance of this arrangement of the invention is also, that it is simple in construction, easy to be made and specifically safe, tight and reliable in operation. It has been found at trying out the arrangement, that it will not work for high pressure in fluid in the interior spaces or working chambers 14,114, when the springs or coned rings 1,2 are too thin. They must have a thickness, which must be at least one tenth, but better exceed one tenth, of the radial distance from the inner diameter to the outer diameter of the coned ring or spring 1,2. Without such thickness, which is the minimum thickness and which can still be bigger, the coned rings or springs will axially bow out under pressure in chambers or spaces 14,114 and the outer ends will then not hold together. It has further been found, that a very proper seal ring is required to prevent escape of leakage out of spaces 14,114. Because under the pressure in the spaces 14, 114, the springs 1 and 2 deflect axially and radially. That leads to portions of plastic seals entering the seats between springs 1' and 2', if springs 1' and 2' are laid directly onto each other. The entering of portions of plastic seals or the opening of a gap between the neighboring ring springs 1' and 2' makes the pumping or motoring arrangement non-workable and unefficient with high leakage, if the springs 1' and 2' are laid directly onto each other. The invention now discovered, that the difficulties of leakage and opening of a gap can be prevented by the provision of the seat faces 127 on the radial outer portions 27 of the spring, coned ring or springs respectively coned rings 1' or 1' and 2' together in combination with the insertion or provision of a radially plane ring 90 between the otherwise neighboring springs or rings 1' and 2'. Such radially plane ring is called "the outer ring" because it is proper, to insert also an "inner ring" 91 into the arrangement of Figure. The radially plane faces of the outer ring 90 are now forming the respective complementary face 227 to be complementary to the seat face 127 of the respective spring or coned ring and to bear thereto. The interior space of the outer ring 90 then forms a seat space for the reception of a plastic seal, like for example on O-ring. The seal seat space is shown by referential 92 in FIGS. 9 to 11. The axial thickness of the outer ring 90 should be properly dimensioned to have a desired axial length of the seal space 92 for slight compression of the seal ring therein, when it is inserted. To prevent the described entering of portions of seal rings into a gap or clearance, the radial dimension and axial thickness of the outer ring 90 is important. The inner diameter of the outer ring 90 should substantially correspond to the inner diameter of the seat face 127 of the respective spring or coned ring 1' or 2' or to both thereof. To prevent internal compression of fluid in the interior chamber inside of the outer ring and disc springs 90,1 and 2, the inner ring 91 should be inserted radially inside of the seal seat 92. The inner ring 91 should be preferrably of the same axial thickness as the outer ring 90 is and, when the assembly or arrangement is supposed to compress completely to radial planeliness of the coned rings 1',2', the inner ring 91 should be radially plane, as the outer ring 90 is. Inner ring 91 should be provided with a bore 93 to communicate the internal spaces 14 and 114 inside of the coned rings 1' and 2' to a common working chamber 14.

FIGS. 49 and 50 show the equal arrangement of the outer ring, inner ring and seal space 90,91,92,93 between two otherwise adjacent oppositionally directed coned rings or disc springs 1" and 2" or 1"' and 2"'. In Figures to the seal seats or seal spaces 92 are shown, but the seal rings, like O-rings, are not inserted in the Figures. If they would be written into the Figures, the seal seats would not be clearly visible in the Figures any more. Therefore the seals are not written into the Figures. But it is assumed, that the reader of the Figures will clearly understand, how a circular seal ring is laid into a circular seat or annular ring ring groove 92.

The specifity of FIG. 49 is, that the coned ring 1' has on its outer portion an axially bend portion 23 which formes a cylindrical portion in axial direction. The inner diameter of the cylindrical portion 23 corresponds substantially to the outer diameter of the outer portion of the other coned ring 2"'. Thereby the second coned ring 2"' is kept within the axial extension or bend 23 of the first coned ring 1"'. It is important here, that the first coned ring 1"' has a smaller radial expansion at axial compression, than the second coned ring 2"' actually has. Therefore it is required to have at the axially decompressed or expanded configuration of the coned rings or disc springs 1"' and 2"' a small radial clearance between the outer diameter of the second ring 2"' and the inner diameter of the axial extension 23 of the first ring 1"'.

FIG. 50 contains in its upper portion the same arrangement as FIG. 9. In FIG. 11 the arrangement is in a larger scale and the seat face portions are provided on radially plane outer portions of the coned rings or disc springs 1" and 2". If the size of the coned rings of FIG. 9 are provided in FIG. 11, the outer ring 90 extends radially outwardly beyond the rings 1" and 2". Head body 95 contains the entrance and exit valves 11 and 12 to the interior spaces 14 and 114, which form over the bore 93 in inner ring 91 the working chamber 14-114 or simply 14. The coned rings or disc springs 1" and 2" are periodically compressed and expanded, which means axially compressed and expanded by the recicprocal movement of drive piston 108 along the common axis 1000. The common axis 1000 is the coinciding axis of the axes of the coned rings 1" and 2", of the inner and outer rings 90 and 91, of the piston 108 and of the cylindrical portion 107 of the housing of the arrangement of Figure. The shaft 11 revolves around the centrical axis 85 of the shaft 11. An eccenter-ring 10 is mounted on shaft 11 to revolve with shaft 11. The eccentric ring 10 has an outer guide face 88 for the guiding of the inner guide face 87 of the piston shoe 109. The guide face 88 is formed cylindrically with a constant radius around the eccentric axis 86 and thereby the outer face 88 is eccentric relative to the axis 85. The result thereof is, that at revolution of shaft 11 and eccentric ring 10 the outer face 88 thrusts the piston shoe 109 periodically upwards against the piston 108, whereby piston 108 presses against the coned ring 2 to compress it and coned ring 2 presses against the outer ring 90 to move it upwards, while the outer ring 90 presses against the first coned ring 1" to compress it. Thereby the working chamber 14 is reduced to its smallest volume. At further rotation of shaft 11, the expansion follows, at which the described movements appear in opposite direction along the common axis 1000, whereby the springs 1" and 2" expand, while the working chamber 14 expands to obtain its largest volume. A similar action is also reported at hand of FIG. 6. However it has now been found, that the arrangement tends to block and to stop, when no specific care has been taken to prevent radial displacement of the piston, piston shoe or spring or coned ring(s). The movement of the outer face 88 along the inner face 87 of the piston shoe 109 occurs under heavy load from the springs 1",2" against the faces 88,87. This results in friction between faces 87 and 88. This friction tries to move the piston shoe 109 away from the common axis 1000 in the direction of the movement of the guide face 88. When such movement or dislocation of the piston shoe 108 occurs, the swing centre or pivot centre dislocates away from the common axis 1000. The result thereof is, as the invention discovers, a variation (increase) of the distance of the face 87 from the top body 95. Since however, the face 88 does not permit an increase in the axial distance from the top body or first body 95, the assembly blocks. No part moves any more and everything in the arrangement of FIGS. 45 or 50 would stop and stick.

The invention now has at intensive trials found out, that such stopping and sticking can become prevented by the provision of the cylindrical inner face 181 on a cylindrical portion 107 and the fitting of an outer face 182 of cylindrical piston 108 on the cylindrical inner face 181 of cylindrical portion 107. The cylindrical portion 107 must be respectively fixed to maintain and keep the locations and positions of the first body or top cover 95 and shaft 11 around axis 85 in the respective relation relatively to each other.

The cylindrical faces 182 and 181 should be axially long enough to provide a good guidance and to prevent tilting of the axis of the piston 108. In the arrangement of Figure the radial dislocation away from the common axis 1000 is prevented by the guide portions 67 on piston shoe 9.

Comparing the arrangements of FIGS. 45 and 50, it will be seen, that FIG. 45 demonstrates the guided piston shoe, while FIG. 50 demonstrates the guided piston in the arrangement of the fluid pump or motor with eccentric cam drive means for the periodic expansion and compression of at least one coned ring or disc spring. One of the members, either the piston shoe or the piston should be guided in accordance with the invention, if the arrangement builts axially long along the common axis 1000. Only in case of axially very short arrangements, for example such wich have only a single or only a single pair of disc spring(s) or coned rings, may the guidance of the piston or shoe be spared. The described parts, details and functions of one of the Figures apply similarily to respective others of the Figures. Thereby description of similar parts and referential numbers in pluralities of the Figures is spared at others of the Figures when it is done at one of the Figures. The relationships, which have been described for the outer rings 90, inner rings 91, seal seats 92 for plastic seals 75 of FIG. 6, seat face portions 127, complementary face portions 227, thicknesses of coned rings and so on, are important to obtain the desired result of the invention.

A safe and reliable action of the arrangements of the invention can be obtained, if the details, which are described are fully obeyed.

In FIG. 50 the faces 83 and 84 are formed again with equal radii around a common center. Thereby the piston shoe 109 can pivot with its pivot face 83 on the bearing bed 84 of piston 108. The seal rings of FIG. 6 are not shown in FIG. 50 in order to make the seal ring seats 92 more clearly visible. In the actual assembly, the mentioned seal rings are, however, inserted into the seal ring seats 92 of FIG. 50.

The clearance 26 in FIG. 44 is preferred to correspond to the following equation:

Radial: size of $26 = 0.5\{\sqrt{(\Delta R \times tg\gamma)^2 + (\Delta R)^2} - \Delta R\}$ in which the equation gives the radial distance of the gap 26 in FIG. 44, with "delta R" being the radial distance between the radially inner and outer ends of the coned portions of the rings, while the angle of inclination of the coned portions is "gamma". To obey this rule is suitable to prevent pressing of portions of the rings under force.

In FIGS. 48 and 50 in which the outer ring 90 deforms radially outwards under the pressure in fluid radially inside of this outer ring 90, it is preferred to extend the ring 90 radially in such extent that is deforms substantially parallel to the radial outwards movement of the radial outer ends of the coned rings during their axial compression in order to limit or prevent a relative radial movement between the ring 90 and the adjacent coned rings 1',1",2' and/or 2".

When the spring pair set pump assembly is mounted to a machine or vehicle, which has a pump or a fluid motor, it is especially convinient to communicate the respective pressure passage of such pump or fluid motor with the mentioned pressure space.

A respective control arrangement may then become provided to ensure the properly timed communication of the mentioned pressure space during compression action of the springs with the respective passages, ports or like and thereby with the respective faces between the thrust body, slide shoe, outer face of the cam or the respective pluralities of them.

When a seal means is provided between the inner wall of the mentioned hollow body and the thrust body or the slide body, the chamber which then formes between the inner wall of the hollow body and the outer faces of the springs as well as the respective thrust body or slide shoe may be utilized as a second pumping chamber. The second pumping chamber may supply a respective second flow of fluid which may be later combined with the flow of fluid out of the chamber between the springs or it may be passed away from the pumping arrangement separately.

For a high uniformity of flow it is preferred to arrange a plurality of spring set pumping arrangements around the common eccentre-cam or other suitable driving means. The suction stroke of the pump will be accomplished mostly by the expansion force of the disc springs of the disc spring pairs.

For corrosion providing liquids or gases it is preferred to make the disc springs of the invention by non-corroding materials, metals or plastics.

What is claimed, is:

1. A fluid machine for the intake and explusion of a fluid, comprising, in combination, a first body (98), a second body (99), a control body (102), passages, working chambers which periodically increase and decrease their volumes, and an improvement, wherein said improvement includes:
    (a) passages (161) through said first body to port into holding recesses (22) which are provided in said first body,
    (b) a piston shoe guide face (156) provided on said second body,
    (c) pistons 36, piston shoes 21 and coned rings 1,2 provided between said first and second bodies with partial extension of said pistons into said holding recesses, with said
    (d) piston shoes provided between said pistons and said second body, and with said coned rings comprising
    (e) at least one hollow coned ring, which has a medial bore, between a portion of a respective piston and a respective holding recess of said holding recesses,
    (f) passages through said piston and through said piston shoes to port into pockets of hydrostatic bearings between said piston shoes and said guide face, wherein one of said bodies moves respective to the other of said bodies to provide a periodic compression and expansion of said coned rings whereby said coned rings provide said working chamber and take in and expell fluid from and to respective ports in said control body, wherein said piston forms a head portion and a therefrom axially extending pipe portion with said head portion extending radially outwards beyond said pipe portion, and, wherein said pipe portion is inserted into the medial bore of said hollow coned ring.

2. The machine of claim 1,
    wherein said piston shoe forms a part cylindrical slide face to slide along said piston shoe guide face with said part cylindrical slide face curved complementary relative to the radius of said piston shoe guide face,
    wherein said piston shoe forms on its opposite end a part spherical pivot face of a pivot bed radius, while said piston head forms a part spherical pivot bed with said pivot radius, and;
    wherein said pivot face of said piston shoe is pivotably borne in said pivot bed of said piston head.

3. The machine of claim 2,
    wherein a plurality of coned rings replaces said at least one hollow coned ring to form a set of coned rings whereby all coned rings are placed axially behind each other with a first ring of each pair of rings oppositionally directed relative to the second ring of the respective pair of rings, and,
    wherein said pipe portion of said piston extends through all bores of said coned rings to guide said medial bores of said coned rings axially of each other.

4. The machine of claim 3,
    wherein said piston forms on said portion head adjacent to said pipe portion a radially plane seat face for the reception of one of said coned rings of said set of coned rings while the axially opposite-most coned ring is borne on the bottom face of said holding recess.

5. The machine of claim 4,
    wherein the interior of said pipe portion together with passages through said piston and said piston shoe form a communication from said passage in said first body to said fluid pressure pocket of said hydrostatic bearing on said piston shoe.

6. The machine of claim 5,
wherein a distance is provided between the axis of said piston shoe guide face and the axis of said first body to form an eccentricity between said first body and said piston shoe guide face while at least one of said bodies is revolvably provided to revolve around its axis,
wherein said piston shoes periodically compress and expand said coned rings when said one of said bodies revolves.

7. The machine of claim 6,
wherein said control body includes at least one passage and at least one control port while said first body is provided with a control face to seal and slide along a complementary control face of said control body for periodic communication and discommunication of said control port and the respective passages through said first body.

8. The machine of claim 7,
wherein said control body has an entrance control port and an exit control port for transferring of fluid at the respective time into respective passages through said first body and to exhaust fluid from other passages of said passages through said first body, whereby fluid is passed into the interiors of said coned rings when said coned rings expand and fluid is passed out of said interiors of said coned rings when said coned rings compress.

9. The machine of claim 7,
wherein a control recess 101 is provided in said second body 99, extending wherein said control recess is open radially inwardly and located radially outwardly of said pockets of said piston shoes, whereby said pockets communicate temporarily at each revolution of one of said bodies with said control recess to lead fluid from said control recess through said passages to said at least one control port of said control body or vice versa, whereby said control recess replaces one of said ports of said control body.

* * * * *